US012770559B2

(12) United States Patent
Feng et al.

(10) Patent No.: US 12,770,559 B2
(45) Date of Patent: Oct. 20, 2026

(54) PIXEL CIRCUIT, DRIVING METHOD THEREOF, AND DISPLAY DEVICE

(71) Applicants: HEFEI BOE JOINT TECHNOLOGY CO., LTD., Hefei (CN); BOE TECHNOLOGY GROUP CO., LTD., Beijing (CN); BEIJING BOE TECHNOLOGY DEVELOPMENT CO., LTD., Beijing (CN)

(72) Inventors: Xuehuan Feng, Beijing (CN); Yongqian Li, Beijing (CN)

(73) Assignees: HEFEI BOE JOINT TECHNOLOGY CO., LTD., Hefei (CN); BOE TECHNOLOGY GROUP CO., LTD., Beijing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 15 days.

(21) Appl. No.: 18/693,770

(22) PCT Filed: Aug. 16, 2023

(86) PCT No.: PCT/CN2023/113316
§ 371 (c)(1),
(2) Date: Mar. 20, 2024

(87) PCT Pub. No.: WO2025/035418
PCT Pub. Date: Feb. 20, 2025

(65) Prior Publication Data
US 2025/0246136 A1 Jul. 31, 2025

(51) Int. Cl.
*G09G 3/3233* (2016.01)

(52) U.S. Cl.
CPC ..... *G09G 3/3233* (2013.01); *G09G 2300/043* (2013.01); *G09G 2300/0852* (2013.01);
(Continued)

(58) Field of Classification Search
CPC ........... G09G 3/3233; G09G 2300/043; G09G 2300/0852; G09G 2310/061; G09G 2310/08; G09G 2320/0233
See application file for complete search history.

(56) References Cited

FOREIGN PATENT DOCUMENTS

| | | |
|---|---|---|
| CN | 109872692 A | 6/2019 |
| CN | 110706654 A | 1/2020 |

(Continued)

OTHER PUBLICATIONS

International Search Report mailed Aug. 24, 2023 in International Application No. PCT/CN2023/113316.

*Primary Examiner* — Nitin Patel
*Assistant Examiner* — Gloryvid Figueroa-Gibson
(74) *Attorney, Agent, or Firm* — Dilworth & Barrese, LLP.; Michael J. Musella, Esq.

(57) ABSTRACT

A pixel circuit and its driving method, as well as a display device, are disclosed. The pixel circuit includes a driving circuit, a first compensation circuit, and a second compensation circuit. The first compensation circuit includes a first storage capacitor, with a first electrode of the first storage capacitor connected to the control terminal of the driving circuit, and a second electrode of the first storage capacitor connected to the first terminal of the driving circuit. The second compensation circuit includes a second storage capacitor and a first switching transistor. A first electrode of the second storage capacitor is connected to the first terminal of the driving circuit, a first electrode of the first switching transistor is connected to the second storage capacitor, and the gate electrode of the first switching transistor is configured to receive a second compensation control signal.

18 Claims, 23 Drawing Sheets

108

(52) U.S. Cl.
CPC ... *G09G 2310/061* (2013.01); *G09G 2310/08* (2013.01); *G09G 2320/0233* (2013.01)

(56) References Cited

FOREIGN PATENT DOCUMENTS

| | | | | |
|---|---|---|---|---|
| CN | 111508422 | A | | 8/2020 |
| CN | 114708838 | A | | 7/2022 |
| CN | 115294941 | A | | 11/2022 |
| CN | 115966172 | A | * | 4/2023 |

* cited by examiner

106

106

106

106

109

110

112

PIXEL CIRCUIT, DRIVING METHOD THEREOF, AND DISPLAY DEVICE

This application is a national stage application, filed under 35 U.S.C. § 371, of International Patent Application No. PCT/CN2023/113316, filed on Aug. 16, 2023, which is incorporated by reference herein in its entirety.

TECHNICAL FIELD

At least one embodiment of the present disclosure relates to a pixel circuit, a driving method thereof, and a display device.

BACKGROUND

With the continuous development of display technology, pixel circuits with Low Temperature Polycrystalline Oxide (LTPO) has been increasingly used in display devices. When combined with a narrow bezel design, LTPO pixel circuits offer a high refresh rate, low current leakage, and improved stability of the gate electrode voltage of the driving transistor.

SUMMARY

At least one embodiment of the disclosure provides a pixel circuit and a driving method thereof, and a display device.

At least one embodiment of the disclosure provides a pixel circuit comprising a driving circuit, a first compensation circuit, and a second compensation circuit. The driving circuit includes a control terminal, a first terminal and a second terminal, and configured to control a magnitude of driving current flowing through the first terminal and the second terminal; the first compensation circuit is configured to apply a reference signal to the control terminal of the driving circuit in response to a first compensation control signal, wherein the first compensation circuit comprises a first storage capacitor, and a first electrode of the first storage capacitor is electrically connected to the control terminal of the driving circuit, and a second electrode of the first storage capacitor is electrically connected to the first terminal of the driving circuit; the second compensation circuit includes a second storage capacitor and a first switching transistor, wherein a first electrode of the second storage capacitor is electrically connected to the first terminal of the driving circuit, and a first electrode of the first switching transistor is electrically connected to the second storage capacitor, a gate electrode of the first switching transistor is configured to receive a second compensation control signal, and the second compensation circuit is configured to compensate the driving circuit in response to the second compensation control signal.

For example, the pixel circuit according to at least one embodiment of the disclosure further comprises: a light-emitting element, configured to emit light upon being driven by the driving current, wherein the first terminal of the driving circuit is electrically connected to a first electrode of the light-emitting element, and the driving circuit is configured to control a magnitude of driving current flowing through the light-emitting element; the driving circuit comprises a driving transistor, a gate electrode of the driving transistor serves as the control terminal of the driving circuit and is electrically connected to a first node, and a first electrode of the driving transistor serves as the first terminal of the driving circuit and is electrically connected to a second node, and the second electrode of the driving transistor serves as the second terminal of the driving circuit and is electrically connected to a third node.

For example, in the pixel circuit according to at least one embodiment of the disclosure, the first electrode of the first switching transistor is electrically connected to the first electrode of the second storage capacitor, and a second electrode of the first switching transistor is electrically connected to the second node.

For example, in the pixel circuit according to at least one embodiment of the disclosure, the first electrode of the second storage capacitor is electrically connected to the second node, and a second electrode of the second storage capacitor is electrically connected to the first electrode the first switching transistor.

For example, the pixel circuit according to at least one embodiment of the disclosure further comprises a reset circuit, wherein a control terminal of the reset circuit is configured to receive a reset control signal, a first terminal of the reset circuit is electrically connected to the first electrode of the light-emitting element, and a second terminal of the reset circuit is electrically connected to a reset signal terminal to receive a reset signal, and the reset circuit is configured to apply the reset signal to the first electrode of the light-emitting element and the first terminal of the driving circuit in response to the reset control signal; the reset circuit comprises a reset transistor, a gate electrode of the reset transistor is electrically connected to a reset control terminal to receive the reset control signal, and a first electrode of the reset transistor is electrically connected to the first electrode of the light-emitting element, a second electrode of the reset transistor is electrically connected to the reset signal terminal to receive the reset signal.

For example, in the pixel circuit according to at least one embodiment of the disclosure, a second electrode of the second storage capacitor is electrically connected to a constant voltage terminal to receive a constant voltage from the constant voltage terminal.

For example, in the pixel circuit according to at least one embodiment of the disclosure, the first electrode of the first switching transistor is electrically connected to the first electrode of the second storage capacitor, and a second electrode of the first switching transistor is electrically connected to the second node, and the second electrode of the second storage capacitor is electrically connected to the constant voltage terminal.

For example, in the pixel circuit according to at least one embodiment of the disclosure, the first electrode of the second storage capacitor is electrically connected to the second node, and the second electrode of the second storage capacitor is electrically connected to the first electrode of the first switching transistor, a second electrode of the first switching transistor is electrically connected to the constant voltage terminal.

For example, in the pixel circuit according to at least one embodiment of the disclosure, the reset transistor serves as the first switching transistor, and the reset control signal serves as the second compensation control signal, and the reset signal terminal which is electrically connected to the second electrode of the reset transistor serves as the constant voltage terminal; the first electrode of the second storage capacitor is electrically connected to the second node, and the second electrode of the second storage capacitor is electrically connected to the second electrode of the reset transistor to be electrically connected to the reset signal terminal.

For example, in the pixel circuit according to at least one embodiment of the disclosure, a second electrode of the second storage capacitor is electrically connected to the first electrode of the light-emitting element, and the first electrode of the reset transistor is electrically connected to the first electrode of the light-emitting element.

For example, in the pixel circuit according to at least one embodiment of the disclosure, the pixel circuit further comprises a first light-emitting control circuit, a control terminal of the first light-emitting control circuit is configured to receive a first light-emitting control signal, a first terminal of the first light-emitting control circuit is electrically connected to the second terminal of the driving circuit, and a second terminal of the first light-emitting control circuit is electrically connected to a first voltage terminal to receive a first power supply voltage, the first light-emitting control circuit is configured to apply the first power supply voltage to the second terminal of the driving circuit in response to the first light-emitting control signal; the first light-emitting control circuit comprises a first light-emitting control transistor, a gate electrode of the first light-emitting control transistor is electrically connected to a first light-emitting control terminal to receive the first light-emitting control signal, and a first electrode of the first light-emitting control transistor is electrically connected to the first voltage terminal to receive the first power supply voltage, and a second electrode of the first light-emitting control transistor is electrically connected to the third node.

For example, in the pixel circuit according to at least one embodiment of the disclosure, the pixel circuit further comprises a second light-emitting control circuit, a control terminal of the second light-emitting control circuit is configured to receive a second light-emitting control signal, a first terminal of the second light-emitting control circuit is electrically connected to the second node, a second terminal of the second light-emitting control circuit is electrically connected to the first electrode of the light-emitting element, and the second light-emitting control circuit is configured to apply the driving current to the light-emitting element in response to the second light-emitting control signal and allow the reset signal to be applied to the first terminal of the driving circuit, the second light-emitting control signal being different from the first light-emitting control signal; the second light-emitting control circuit comprises a second light-emitting control transistor, a gate electrode of the second light-emitting control transistor is electrically connected to a second light-emitting control terminal to receive the second light-emitting control signal, and a first electrode of the second light-emitting control transistor is electrically connected to the second node, a second electrode of the light-emitting control transistor is electrically connected to the first electrode of the light-emitting element, and a second electrode of the light-emitting element is electrically connected to a second voltage terminal to receive a second power supply voltage.

For example, in the pixel circuit according to at least one embodiment of the disclosure, the gate electrode of the first switching transistor is electrically connected with the gate electrode of the second light-emitting control transistor, and the first switching transistor shares the gate electrode with the second light-emitting control transistor, the second light-emitting control signal serves as the second compensation control signal, and a type of the first switching transistor is different from a type of the second light-emitting control transistor; or the gate electrode of the first switching transistor and the gate electrode of the second light-emitting control transistor are independent of each other and not electrically connected to each other.

For example, in the pixel circuit according to at least one embodiment of the disclosure, the gate electrode of the first switching transistor is electrically connected to the gate electrode of the reset transistor, and the first switching transistor shares the gate electrode with the reset transistor, the reset control signal serves as the second compensation control signal, and a type of the first switching transistor is the same as a type of the reset transistor; or, the gate electrode of the first switching transistor and the gate electrode of the reset transistor are independent of each other and not electrically connected to each other.

For example, in the pixel circuit according to at least one embodiment of the disclosure, the second compensation circuit further comprises a second switching transistor, a first electrode of the second switching transistor is electrically connected to the second electrode of the second storage capacitor, and a second electrode of the second switching transistor is electrically connected to the constant voltage terminal.

For example, in the pixel circuit according to at least one embodiment of the disclosure, the second compensation circuit further comprises a second switching transistor, the second electrode of the second storage capacitor is electrically connected to a first electrode of the second switching transistor, and a second electrode of the second switching transistor is electrically connected to the first electrode of the light-emitting element.

For example, in the pixel circuit according to at least one embodiment of the disclosure, at least two of the gate electrode of the first switching transistor, a gate electrode of the second switching transistor and the gate electrode of the reset transistor are electrically connected, and the at least two share the gate electrode and are of the same type.

For example, in the pixel circuit according to at least one embodiment of the disclosure, the pixel circuit further comprises a data writing circuit, a control terminal of the data writing circuit is configured to receive a data scan signal, and a first terminal of the data writing circuit is electrically connected to a data signal terminal to receive a data signal, and a second terminal of the data writing circuit is electrically connected to the first node, the data writing circuit is configured to write the data signal to the control terminal of the driving circuit in response to the data scan signal; wherein the data writing circuit comprises a data writing transistor, a gate electrode of the data writing transistor is electrically connected to a data scan signal terminal to receive the data scan signal, a first electrode of the data writing transistor is electrically connected to the data signal terminal to receive the data signal, and a second electrode of the data writing transistor is electrically connected to the first node.

For example, in the pixel circuit according to at least one embodiment of the disclosure, a control terminal of the first compensation circuit is configured to receive the first compensation control signal, and a first terminal of the first compensation circuit is electrically connected to a reference signal terminal to receive the reference signal, the first compensation circuit comprises a first compensation transistor, a gate electrode of the first compensation transistor is electrically connected to a first compensation control signal terminal to receive the first compensation control signal, a first electrode of the first compensation transistor is electrically connected to the reference signal terminal to receive the reference signal, and a second electrode of the first compensation transistor is electrically connected to the first node.

At least one embodiment of the disclosure further provides a display device, comprising the pixel circuit according to any embodiments as mentioned above.

At least one embodiment of the disclosure further provides a driving method, suitable for the pixel circuit according to any embodiments as mentioned above, the driving method comprising: in a data writing stage, making the second compensation control signal be a turn-on signal to turn on the first switching transistor; upon entering a light-emitting stage from the data writing stage, making the second compensation control signal be switched from a turn-on signal to a turn-off signal to turn off the first switching transistor, wherein, in the light-emitting stage, the second compensation control signal remains as the turn-off signal.

For example, in the driving method according to at least one embodiment of the disclosure, the pixel circuit further comprises a data writing circuit, a control terminal of the data writing circuit is configured to receive a data scan signal, a first terminal of the data writing circuit is electrically connected to a data signal terminal to receive a data signal, a second terminal of the data writing circuit is electrically connected to a first node, and the data writing circuit is configured to write the data signal into the control terminal of the driving circuit in response to the data scan signal; the driving method further comprises: in the data writing stage, making the data scan signal be a turn-on signal to write the data signal to the control terminal of the driving circuit; and upon entering the light-emitting stage from the data writing stage, making the data scan signal be switched from the turn-on signal to a turn-off signal to turn off the data writing circuit and the first switching transistor simultaneously, wherein in the light-emitting stage, the data scan signal remains as the turn-off signal.

For example, the driving method according to at least one embodiment of the disclosure further comprises: in a compensation stage before the data writing stage, making the second compensation control signal be a turn-on signal to turn on the first switching transistor, and the second compensation circuit is configured to compensate the driving circuit in response to the second compensation control signal.

For example, in the driving method according to at least one embodiment of the disclosure, in the compensation stage, a second electrode of the second storage capacitor receives a constant voltage from a constant voltage terminal.

For example, in the driving method according to at least one embodiment of the disclosure, the pixel circuit further comprises a light-emitting element, a second light-emitting control circuit and a reset circuit; the light-emitting element is configured to emit light upon being driven by the driving current; a control terminal of the second light-emitting control circuit is configured to receive a second light-emitting control signal, a first terminal of the second light-emitting control circuit is electrically connected to the first terminal of the driving circuit, and a second terminal of the second light-emitting control circuit is electrically connected to a first electrode of the light-emitting element; a control terminal of the reset circuit is configured to receive a reset control signal, and a first terminal of the reset circuit is electrically connected to the first electrode of the light-emitting element, a second terminal of the reset circuit is electrically connected to a reset signal terminal to receive a reset signal, the driving method further comprises: in a reset stage before the compensation stage, making the first compensation control signal be a turn-on signal to turn on the first compensation circuit, so that the first compensation circuit applies the reference signal to the control terminal of the driving circuit, making the second light-emitting control signal be a turn-on signal to turn on the second light-emitting control circuit, and making the reset control signal be a turn-on signal to turn on the reset circuit, so that the reset signal is applied to the first electrode of the light-emitting element through the reset circuit, and the reset signal is applied to the first terminal of the driving circuit through the second light-emitting control circuit.

For example, in the driving method according to at least one embodiment of the disclosure, in each of the reset stage, the compensation stage, the data writing stage, and the light-emitting stage, the second compensation control signal and the second light-emitting control signal are opposite switching signals to control switching states of their corresponding circuits to be opposite.

BRIEF DESCRIPTION OF DRAWINGS

In order to more clearly illustrate the technical solutions of the embodiments of the present disclosure, the accompanying drawings of the embodiments will be briefly described below, and it will be apparent that the accompanying drawings in the following description relate only to some of the embodiments of the present disclosure and are not a limitation of the present disclosure.

DETAILED DESCRIPTION

Figure 1:
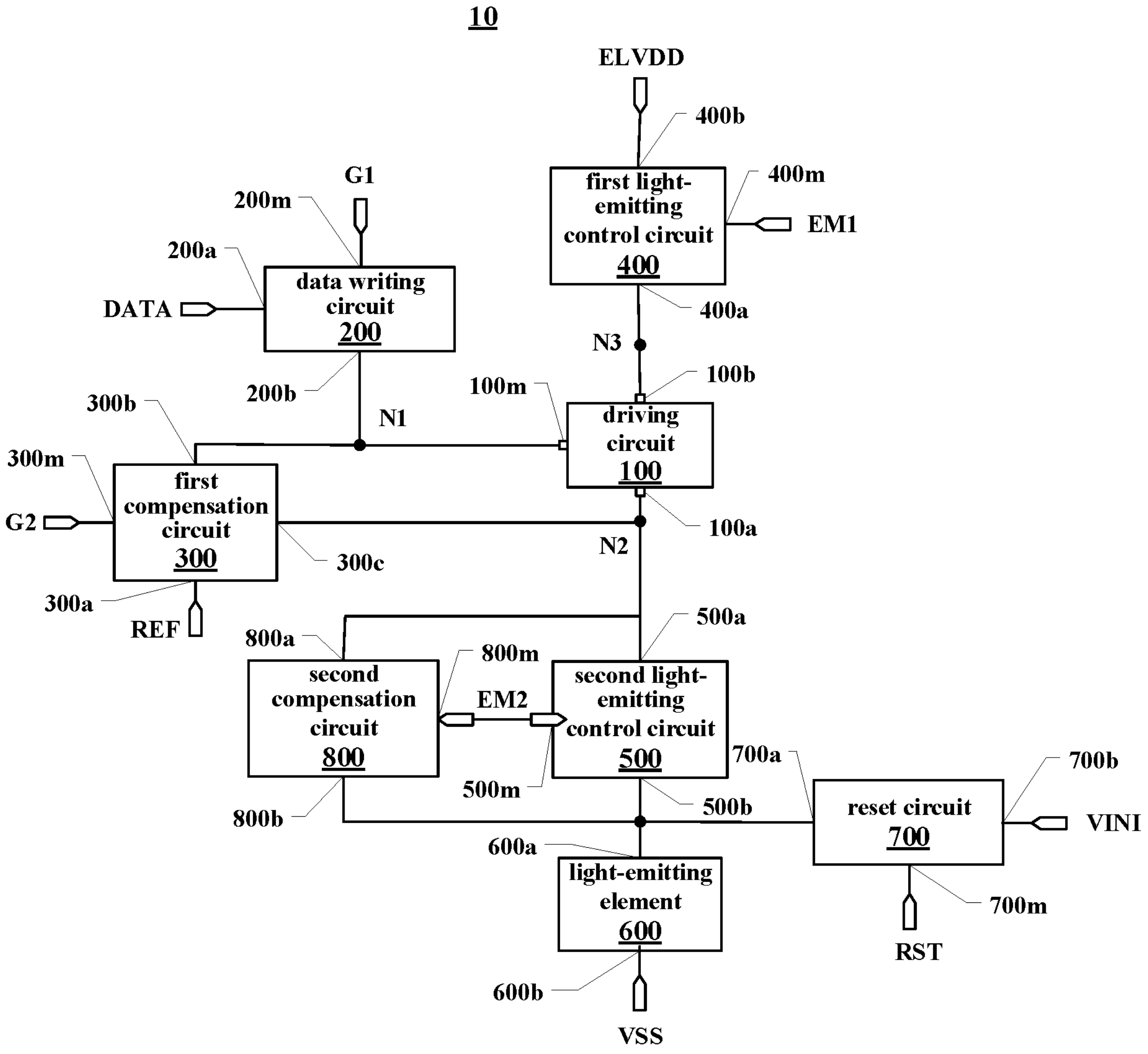
FIG. 1 is a schematic block diagram of a pixel circuit provided by at least one embodiment of the present disclosure.

In order to make the purpose, technical solutions and advantages of the embodiments of the present disclosure clearer, the technical solutions of the embodiments of the present disclosure will be described clearly and completely in the following in conjunction with the accompanying drawings of the embodiments of the present disclosure. Obviously, the described embodiments are a part of the embodiments of the present disclosure, and not all of the embodiments. Based on the described embodiments of the present disclosure, all other embodiments obtained by a person of ordinary skill in the art without the need for creative labor fall within the scope of protection of the present disclosure.

Unless otherwise defined, technical or scientific terms used in the present disclosure shall have the ordinary meaning understood by a person of ordinary skill in the art to which the present disclosure belongs. The terms “first”, “second”, and the like as used in the present disclosure do not indicate any order, number, or significance, but are only used to distinguish different components. Words such as “including” or “comprising” and the like are intended to mean that the component or object preceded by the word encompasses the component or object enumerated after the word and its equivalents, and does not exclude other components or objects.

Features such as “perpendicular”, “parallel”, and “the same” as used in embodiments of the present disclosure include “perpendicular”, “parallel”, and “identical” in the strict sense, as well as “substantially perpendicular”, “substantially parallel”, “approximately the same”, etc. that include a certain amount of error, taking into account the measurement and the error associated with the measurement of the particular quantity (i.e., the limitations of the measurement system), which indicates being within a range of acceptable deviations for the particular value as determined by a person of ordinary skill in the art. “Center” in embodiments of the present disclosure may include a location strictly at the geometric center as well as a location approximately at the center within a small area around the geometric center.

Display devices may experience short-term residual images when displaying, meaning that after displaying the same image for a period of time, when the image currently displayed is switched to a next image, the original image partially remains and emerges in the next image, and then after a period of time, the short-term residual image will disappear. The short-term residual image may be caused by a lag effect in the driving transistor of the pixel circuit. The lag effect is mainly due to the shifting of a threshold voltage (Vth) caused by movable ions remaining in holes. When the display device switches images, the Vgs (a voltage difference between the gate electrode and the source electrode of the driving transistor) of the driving transistor in the initialization stage may be different, causing the threshold voltage of the driving transistor to shift.

For example, after the display device has displayed an initial image for a period of time, when the display device switches to a new image, the initial image is partially retained for several hours, thereby affecting the display. Therefore, there is an urgent need to solve a problem of the threshold voltage (Vth) shifting of the driving transistor.

Meanwhile, in the pixel circuit, a first electrode of the data writing transistor is usually electrically connected to a gate electrode of the driving transistor, so that the data writing transistor can write a data signal to the gate electrode of the driving transistor in response to a data scan signal. When the pixel circuit is switched to a light-emitting stage, the data writing transistor is in a turn-off state, because a parasitic capacitance may exist between the gate electrode of the data writing transistor and the first electrode of the data writing transistor, at the moment when the data writing transistor is turned off, a voltage at the first electrode of the data writing transistor may be reduced, thereby reducing the gate-source voltage Vgs of the driving transistor in the light-emitting stage. Therefore, in the case where the gate-source voltages Vgs of the driving transistors of different sub-pixels in the display panel are reduced to different degrees during the light-emitting stage, the brightness of different sub-pixels is different, which in turn affects the brightness uniformity of the entire display panel. In addition, because the internal structure of the pixel circuit is complex, a parasitic capacitance may exist between an external signal and the driving transistor, which may cause crosstalk, causing the display panel to display abnormally and affecting the display effect.

At least one embodiment of the present disclosure provides a pixel circuit, a driving method thereof, and a display device.

A pixel circuit provided by at least one embodiment of the present disclosure includes a driving circuit, a first compensation circuit, and a second compensation circuit, the driving circuit includes a control terminal, a first terminal, and a second terminal, and is configured to control a magnitude of driving current flowing through the first terminal and the second terminal; the first compensation circuit is configured to apply a reference signal to the control terminal of the driving circuit in response to a first compensation control signal, the first compensation circuit comprises a first storage capacitor, and a first electrode of the first storage capacitor is electrically connected to the control terminal of the driving circuit, and a second electrode of the first storage capacitor is electrically connected to the first terminal of the driving circuit; the second compensation circuit comprises a second storage capacitor and a first switching transistor, a first electrode of the second storage capacitor is electrically connected to the first terminal of the driving circuit, and a first electrode of the first switching transistor is electrically connected to the second storage capacitor, a gate electrode of the first switching transistor is configured to receive a second compensation control signal, and the second compensation circuit is configured to compensate the driving circuit in response to the second compensation control signal.

The pixel circuit provided by at least one embodiment of the present disclosure can reduce the influence caused by the shifting of the threshold voltage of the driving transistor by electrically connecting one electrode of the second storage capacitor of the second compensation circuit to the first terminal of the driving circuit; at the same time, by arranging the first switching transistor electrically connected to the second storage capacitor, on the one hand, a voltage of the first terminal of the driving circuit can be reduced when the first switching transistor is switched from a turn-on state to a turn-off state upon the pixel circuit being switched to the light-emitting stage, which can reduce the influence of the data writing transistor on reducing the gate voltage of the driving transistor when it is turned off, and makes the Vgs of the driving transistor fluctuate less in the light-emitting stage to improve the brightness uniformity of the display panel; on the other hand, the first switching transistor can further reduce the parasitic capacitance between other external signal and the driving transistor, thereby reducing crosstalk and improving the display effect. During the operation of the pixel circuit, rapidly reducing the voltage of the first terminal of the driving circuit when the pixel circuit is switched into the light-emitting stage is a difficulty and an important factor affecting the display uniformity, and thus this problem solved by the pixel circuit provided by the embodiment of the present application is of great significance for improving display quality.

The pixel circuit, the driving method thereof, and the display device provided by the embodiments of the present disclosure will be described below with reference to the accompanying drawings.

FIG. 1 is a schematic block diagram of a pixel circuit provided by at least one embodiment of the present disclosure.

As illustrated in FIG. 1, a pixel circuit 10 includes a driving circuit 100, a data writing circuit 200, a first compensation circuit 300, a first light-emitting control circuit 400, a second light-emitting control circuit 500, a light-emitting element 600, a reset circuit 700 and a second compensation circuit 800.

As illustrated in FIG. 1, the driving circuit 100 includes a control terminal 100*m*, a first terminal 100*a* and a second terminal 100*b*, the control terminal 100*m* of the driving circuit 100 is electrically connected to a first node N1, a first terminal 100*a* of the driving circuit 100 is connected to a second node N2, and a second terminal 100*b* of the driving circuit 100 is electrically connected to a third node N3. The driving circuit 100 is configured to control a magnitude of driving current flowing through the first terminal 100*a* and the second terminal 100*b*, for example, the driving current can be configured to drive the light-emitting element 600 to emit light. For example, in the light-emitting stage, the driving circuit 100 can provide the driving current to the light-emitting element 600 to drive the light-emitting element 600 to emit light, and the light-emitting element 600 can emit light according to a required "grayscale".

As illustrated in FIG. 1, the data writing circuit 200 includes a control terminal 200*m*, a first terminal 200*a* and a second terminal 200*b*. The control terminal 200*m* of the data writing circuit 200 is configured to receive a data scan signal G1, a first terminal 200*a* of the data writing circuit 200 is electrically connected to a data signal terminal DATA to receive a data signal DATA, and a second terminal of the data writing circuit 200 is electrically connected to the first node N1. The data writing circuit 200 is configured to write the data signal DATA to the control terminal 100*m* of the driving circuit 100 in response to the data scan signal G1. For example, in the data writing stage, the data writing circuit 200 is turned on in response to the data scan signal G1, thereby writing the data signal DATA to the control terminal 100*m* of the driving circuit 100. For example, the data signal DATA may be stored in the first compensation circuit 300 to generate the driving current for driving the light-emitting element 600 to emit light according to the data signal DATA in, for example, the light-emitting stage.

As illustrated in FIG. 1, the first compensation circuit 300 includes a control terminal 300*m*, a first terminal 300*a*, a second terminal 300*b* and a third terminal 300*c*. The control terminal 300*m* of the first compensation circuit 300 is configured to receive a first compensation control signal G2, the first terminal 300*a* of the first compensation circuit 300 is electrically connected to a reference signal terminal REF to receive a reference signal REF, the second terminal 300*b* is electrically connected to the first node N1, and the third terminal 300*c* of the first compensation circuit 300 is electrically connected to the second node N2. The first compensation circuit 300 is configured to apply the reference signal REF to the control terminal 100*m* of the driving circuit 100 in response to the first compensation control signal G2. For example, the first compensation circuit 300 may include a first storage capacitor, and the first compensation circuit 300 may be turned on in response to the first compensation control signal G2, so that the data signal DATA written by the data writing circuit 200 can be stored in the first storage capacitor of the first compensation circuit 300. For example, the reference signal REF may be a reference voltage.

As illustrated in FIG. 1, the first light-emitting control circuit 400 includes a control terminal 400*m*, a first terminal 400*a* and a second terminal 400*b*. The control terminal 400*m* of the first light-emitting control circuit 400 is configured to receive a first light-emitting control signal EM1, the first terminal 400*a* of the first light-emitting control circuit 400 is electrically connected to the third node N3 to be electrically connected to the second terminal 100*b* of the driving circuit 100, the second terminal 400*b* of the first light-emitting control circuit 400 is electrically connected to a first voltage terminal ELVDD to receive a first power supply voltage ELVDD. The first light-emitting control circuit 400 is configured to apply the first power supply voltage ELVDD to the second terminal 100*b* of the driving circuit 100 in response to the first light-emitting control signal EM1. For example, in the compensation stage, the first light-emitting control circuit 400 may be turned on in response to the first light-emitting control signal EM1, so that the first power supply voltage ELVDD can be applied to the second terminal 100*b* of the driving circuit 100. For example, in the light-emitting stage, the first light-emitting control circuit 400 can also be turned on in response to the first light-emitting control signal EM1, so that the first power supply voltage ELVDD can be applied to the second terminal 100*b* of the driving circuit 100, and in the case where the driving circuit 100 is turned on, the first power supply voltage ELVDD is written into the first terminal 100*a* of the driving circuit 100. Therefore, the driving circuit 100 can apply the first power supply voltage ELVDD to the light-emitting element 600 to provide a driving voltage, thereby driving the light-emitting element 600 to emit light. The second terminal of the light-emitting element 600 receives a second power supply voltage VSS, and the light-emitting element 600 emits light under the action of the first power supply voltage ELVDD and the second power supply voltage VSS. For example, the first power supply voltage ELVDD may be a high voltage, and the second power supply voltage VSS may be a low voltage, but the embodiments of the present disclosure are not limited thereto.

As illustrated in FIG. 1, the second light-emitting control circuit 500 includes a control terminal 500*m*, a first terminal 500*a* and a second terminal 500*b*. The control terminal 500*m* of the second light-emitting control circuit 500 is configured to receive a second light-emitting control signal EM2, the first terminal 500*a* of the second light-emitting control circuit 500 is electrically connected to the second node N2, the second terminal of the second light-emitting control circuit 500*b* is electrically connected to the first electrode 600*a* of the light-emitting element 600. The second light-emitting control circuit 500 is configured to apply the driving current to the light-emitting element 600 in response to the second light-emitting control signal EM2, and is configured to allow a reset signal VINI to be applied to the first terminal 100*a* of the driving circuit 100. For example, in the light-emitting stage, the second light-emitting control circuit 500 is turned on in response to the second light-emitting control signal EM2, so that the driving circuit 100 can apply the driving current to the light-emitting element 600 through the second light-emitting control circuit 500 to make it emit light. For example, in the reset stage, the second light-emitting control circuit 500 may be turned on in response to the second light-emitting control signal EM2, thereby being combined with other circuit elements (for example, the reset circuit 700) to allow the reset signal VINI to be applied to the first terminal 100*a* of the driving circuit 100, so that a reset operation of the driving circuit 100 and the light-emitting element 600 can be realized. For example, in the compensation stage and the data writing stage, the second light-emitting control circuit 500 is turned off in response to the second light-emitting control signal EM2, thereby preventing the light-emitting element 600 from emitting light to improve a contrast of the corresponding display device. For example, the reset signal VINI may be a reset voltage.

For example, as illustrated in FIG. 1, the second light-emitting control signal EM2 is different from the first light-emitting control signal EM1, for example, the two can be electrically connected to different signal output terminals, as mentioned above, for example, the first light-emitting control signal EM1 can be independently made to be a turn-on signal in the compensation stage. For example, the first light-emitting control signal EM1 and the second light-emitting control signal EM2 are both turn-on signals in some time periods, for example, in the light-emitting stage, the first light-emitting control signal EM1 and the second light-emitting control signal EM2 can be made to be turn-on signals at the same time, so that the light-emitting element 600 emits light.

As illustrated in FIG. 1, the light-emitting element 600 includes a first electrode 600*a* and a second electrode 600*b*, the first electrode 600*a* of the light-emitting element 600 is electrically connected to the second terminal 500*b* of the second light-emitting control circuit 500, the second electrode 600*b* of the light-emitting element 600 is electrically connected to the second voltage terminal VSS to receive the second power supply voltage VSS. For example, the second voltage terminal VSS may be grounded, that is, the second power supply voltage VSS may be 0V. For example, the second power supply voltage VSS may be a negative voltage. The light-emitting element 600 is configured to emit light when driven by the driving current, the first terminal 100*a* of the driving circuit 100 is electrically connected to the first electrode 600*a* of the light-emitting element 600, and the driving circuit 100 is configured to control a magnitude of the driving current flowing through the light-emitting element 600. For example, in one example, as illustrated in FIG. 1, the first electrode 600*a* of the light-emitting element 600 may be electrically connected to the first terminal 100*a* of the driving circuit 100 through the second light-emitting control circuit 500, the embodiments of the present disclosure include, but are not limited to this situation. For example, the light-emitting element 600 may use an organic light-emitting diode (OLED). In the embodiments described below, taking the light-emitting element 600 as an OLED as an example, the embodiments of the present disclosure include but are not limited to this. The light-emitting element 600 can further be other types of electroluminescent devices such as an inorganic light-emitting diode and a quantum dot light-emitting element and the like, the embodiments of the present disclosure do not limit a type of the light-emitting element.

As illustrated in FIG. 1, the reset circuit 700 includes a control terminal 700*m*, a first terminal 700*a* and a second terminal 700*b*, the control terminal 700*m* of the reset circuit 700 is configured to receive a reset control signal RST, the first terminal 700*a* of the reset circuit 700 is electrically connected to the first electrode 600*a* of the light-emitting element 600, and the second terminal 700*b* of the reset circuit 700 is electrically connected to the reset signal terminal VINI to receive the reset signal VINI. The reset circuit 700 is configured to apply the reset signal VINI to the first electrode 600*a* of the light-emitting element 600 and the first terminal 100*a* of the driving circuit 100 in response to the reset control signal RST, thereby achieving a reset operation.

As illustrated in FIG. 1, the second compensation circuit 800 includes a control terminal 800*m*, a first terminal 800*a* and a second terminal 800*b*, the control terminal 800*m* of the second compensation circuit 800 is configured to receive a second compensation control signal, the first terminal 800*a* of the second compensation circuit 800 is electrically connected to the second node N2, and the second terminal 800*b* of the second compensation circuit 800 is electrically connected to the first electrode 600*a* of the light-emitting element 600. The second compensation circuit 800 is configured to compensate the driving circuit 100 in response to the second compensation control signal. For example, in the pixel circuit 10 illustrated as FIG. 1, the second compensation circuit 800 and the second light-emitting control circuit 500 share the same control terminal, so that the second light-emitting control signal EM2 simultaneously serves as the second compensation control signal for controlling the second compensation circuit 800 to be turned-on or turned-off, to simplify a structure of the pixel circuit and the control method by using specific requirements of the second light-emitting control signal and the second compensation control signal in the operation of the pixel circuit, but the embodiments of the present disclosure are not limited to this situation. For example, in some embodiments of the present disclosure, the control terminal of the second compensation circuit 800 and the control terminal of the second light-emitting control circuit 500 may be independent of each other, and the second compensation control signal is different from the second light-emitting control signal EM2, and the two signals are controlled independently of each other, the second compensation control signal and the second light-emitting control signal EM2 can come from different signal output terminals, and the embodiments of the present disclosure are not limited to this.

Figure 2A:
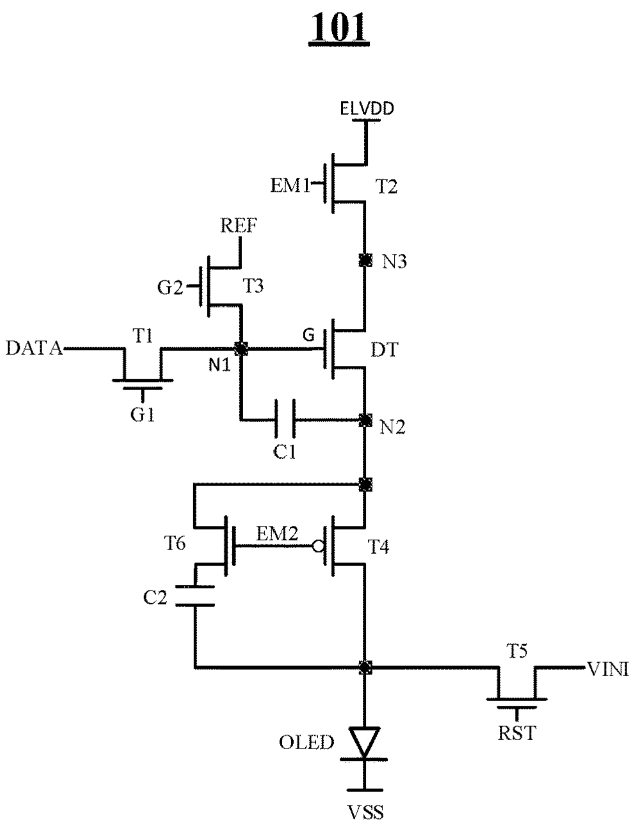
FIG. 2A is a circuit diagram of an implementation example of the pixel circuit as illustrated in FIG. 1.
Figure 3:
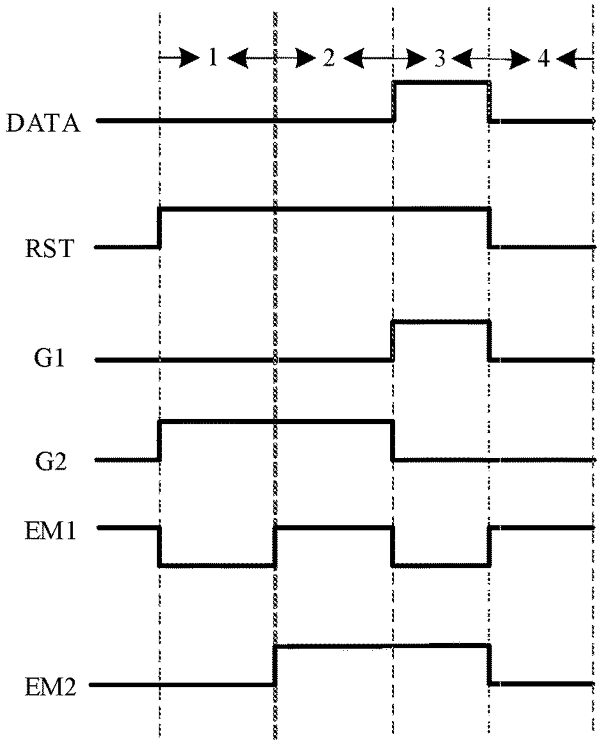
FIG. 3 is a signal timing diagram of a driving method provided by at least one embodiment of the present disclosure.

FIG. 2A is a circuit diagram of an implementation example of the pixel circuit as illustrated in FIG. 1; FIG. 3 is a signal timing diagram of a driving method provided by at least one embodiment of the present disclosure.

For example, the pixel circuit illustrated in FIG. 1 can be implemented as a pixel circuit structure illustrated in FIG. 2A. As illustrated in FIG. 2A, the pixel circuit 101 includes: a driving transistor DT, a data writing transistor T1, a first light-emitting control transistor T2, a first compensation transistor T3, a second light-emitting control transistor T4, a reset transistor T5, a first switching transistor T6, a first storage capacitor C1, a second storage capacitor C2 and a light-emitting element. For example, the data writing transistor T1, the first light-emitting control transistor T2, the first compensation transistor T3, the second light-emitting control transistor T4, the reset transistor T5, and the first switching transistor T6 are configured as switching transistors. For example, the embodiments of the present disclosure are described by taking the light-emitting element as an OLED as an example, which are not limited thereto. For example, the light-emitting element may further be other light-emitting devices, which are not limited in the embodiments of the present disclosure. For example, in the case where the light-emitting element is an OLED, the light-emitting element can be of various types, such as top emission, bottom emission and the like, and the light-emitting element can emit red light, green light, blue light, white light or the like, the embodiments of the present disclosure do not limit this.

For example, as illustrated in FIG. 1 and FIG. 2A, the driving circuit 100 includes a driving transistor DT, a gate electrode of the driving transistor DT serves as the control terminal 100*m* of the driving circuit 100 and is electrically connected to the first node N1; a first electrode of the driving transistor DT serves as the first terminal 100*a* of the driving circuit 100 and is electrically connected to the second node N2; a second electrode of the driving transistor DT serves as the second terminal 100*b* of the driving circuit 100 and is electrically connected to the third node N3.

For example, as illustrated in FIG. 1 and FIG. 2A, the data writing circuit 200 includes a data writing transistor T1, a gate electrode of the data writing transistor T1 is electrically connected to the data scan signal terminal G1 to receive the data scan signal G1, a first electrode of the data writing transistor T1 is electrically connected to the data signal terminal DATA to receive the data signal DATA, and a second electrode of the data writing transistor T1 is electrically connected to the first node N1 (the gate electrode of the driving transistor DT).

For example, as illustrated in FIG. 1 and FIG. 2A, the first light-emitting control circuit 400 includes a first light-emitting control transistor T2, a gate electrode of the first light-emitting control transistor T2 is electrically connected to the first light-emitting control terminal EM1 to receive the first light-emitting control signal EM1, a first electrode of the first light-emitting control transistor T2 is electrically connected to the first voltage terminal ELVDD to receive the first power supply voltage ELVDD, a second electrode of the first light-emitting control transistor T2 is electrically connected to the third node N3 (the second electrode of the driving transistor DT).

For example, as illustrated in FIG. 1 and FIG. 2A, the first compensation circuit 300 includes a first compensation transistor T3 and a first storage capacitor C1. A gate electrode of the first compensation transistor T3 is electrically connected to a first compensation control signal terminal G2 to receive a first compensation control signal G2, a first electrode of the first compensation transistor T3 is electrically connected to the reference signal terminal REF to receive the reference signal REF, a second electrode of the compensation transistor T3 is electrically connected to the first node N1 (the gate electrode of the driving transistor DT). A first electrode of the first storage capacitor C1 is electrically connected to the control terminal 100*m* (the first node N1) of the driving circuit 100, and a second electrode of the first storage capacitor C1 is electrically connected to the first terminal 100*a* (the second node N2) of the driving circuit 100.

For example, as illustrated in FIG. 1 and FIG. 2A, the second light-emitting control circuit 500 includes a second light-emitting control transistor T4, a gate electrode of the second light-emitting control transistor T4 is electrically connected to a second light-emitting control terminal EM2 to receive the second light-emitting control signal EM2, a first electrode of the second light-emitting control transistor T4 is electrically connected to the second node N2 (the first electrode of the driving transistor DT), and a second electrode of the second light-emitting control transistor T4 is electrically connected to the first electrode 600*a* of the light-emitting element 600.

For example, as illustrated in FIG. 1 and FIG. 2A, the light-emitting element 600 can be implemented as a light-emitting diode (LED), such as an organic light-emitting diode (OLED), a quantum dot light-emitting diode (QLED), or an inorganic light-emitting diode, such as a micro LED or a micro OLED.

For example, as illustrated in FIG. 1 and FIG. 2A, the reset circuit 700 includes a reset transistor T5, a gate electrode of the reset transistor T5 is electrically connected to a reset control terminal RST to receive the reset control signal RST, a first electrode of the reset transistor T5 is electrically connected to the first electrode 600*a* of the light-emitting element 600, and a second electrode of the reset transistor T5 is electrically connected to the reset signal terminal VINI to receive the reset signal VINI.

For example, as illustrated in FIG. 1 and FIG. 2A, the second compensation circuit 800 includes a second storage capacitor C2 and a first switching transistor T6, and the second compensation circuit 800 is configured to compensate the driving circuit 100 in response to the second compensation control signal. A gate electrode of the first switching transistor T6 is configured to receive the second compensation control signal, for example, in the pixel circuit 101 illustrated in FIG. 2A, the second light-emitting control signal EM2 serves as the second compensation control signal, but the embodiments of the present disclosure are not limited to this. For example, in the embodiment illustrated in FIG. 2A, a first electrode of the first switching transistor T6 is electrically connected to the second storage capacitor C2, and the second electrode of the first switching transistor T6 is electrically connected to the second node N2 (the first electrode of the driving transistor DT), so that a first electrode of the second storage capacitor C2 is electrically connected to the first terminal 100*a* of the driving circuit 100. For example, in the pixel circuit 101 illustrated in FIG. 2A, the second storage capacitor C2 is indirectly electrically connected to the first terminal 100*a* of the driving circuit 100 through the first switching transistor T6, but the embodiments of the present disclosure are not limited thereto. For example, in some embodiments, the second storage capacitor C2 may be directly electrically connected to the first terminal 100*a* of the driving circuit 100, that is, no other components such as a transistor and a capacitor are provided between the second storage capacitor C2 and the first terminal 100*a* of the driving circuit 100, the embodiments of the present disclosure do not limit a position of the second storage capacitor C2 in the second compensation circuit 800.

It should be noted that in the description of the embodiments of the present disclosure, the first node N1, the second node N2 and the third node N3 do not necessarily represent actual existing components, but represent the meeting points of relevant circuit connections in the circuit diagram. In the description of the embodiments of the present disclosure, the symbol DATA can represent both the data signal terminal and the data signal; similarly, the symbol G1 can represent both the data scan signal terminal and the data scan signal; the symbol REF can represent both the reference signal terminal and the reference signal; the symbol G2 can represent both the first compensation control signal terminal and the first compensation control signal; the symbol EM1 can represent both the first light-emitting control terminal and the first light-emitting control signal; the symbol ELVDD can represent both the first voltage terminal and the first power supply voltage; the symbol EM2 can represent both the second light-emitting control terminal and the second light-emitting control signal; the symbol RST can represent both the reset control terminal and the reset control signal; the symbol VINI can represent both the reset signal terminal and the reset signal, and can also represent the reset voltage; the symbol VSS can represent both the second voltage terminal and the second power supply voltage signal, and the symbol Vx can represent both the constant voltage terminal and the constant voltage, the following embodiments are the same and will not be described again.

It should be noted that the transistors used in the embodiments of the present disclosure may be thin film transistors, field-effect transistors, or other switching devices with the same characteristics, and the thin film transistors are taken as an example to be illustrated in the embodiments of the present disclosure. A source electrode and a drain electrode of the transistor adopted herein may be symmetric in structure, so there is no difference between the source electrode and the drain electrode in structure. In the embodiments of the present disclosure, in order to distinguish the two electrodes apart from the gate electrode, one electrode of the source electrode and the drain electrode is described as the first electrode and the other electrode of the source electrode and the drain electrode is described as the second electrode.

In addition, transistors can be divided into N-type and P-type transistors according to their characteristics. In the case where the transistor is a P-type transistor, a turn-on voltage is a low-level voltage (for example, 0V, −5V, −10V or other suitable voltages), and a turn-off voltage is a high-level voltage (for example, 5V, 10V or other suitable voltages); in the case where the transistor is an N-type transistor, a turn-on voltage is a high-level voltage (for example, 5V, 10V or other suitable voltages), and a turn-off voltage is a low-level voltage (for example, 0V, −5V, −10V or other suitable voltages). However, the embodiments of the present disclosure do not limit the type of the transistor, in the case where the type of the transistor changes, the connection relationship in the circuit can be adjusted accordingly.

A working principle of the pixel circuit 101 as illustrated in FIG. 2A will be described below with reference to the signal timing diagram as illustrated in FIG. 3. As illustrated in FIG. 3, a display process of each frame of image includes four stages, which are respectively a reset stage 1, a compensation stage 2, a data writing stage 3, and a light-emitting stage 4.

Figure 2B:
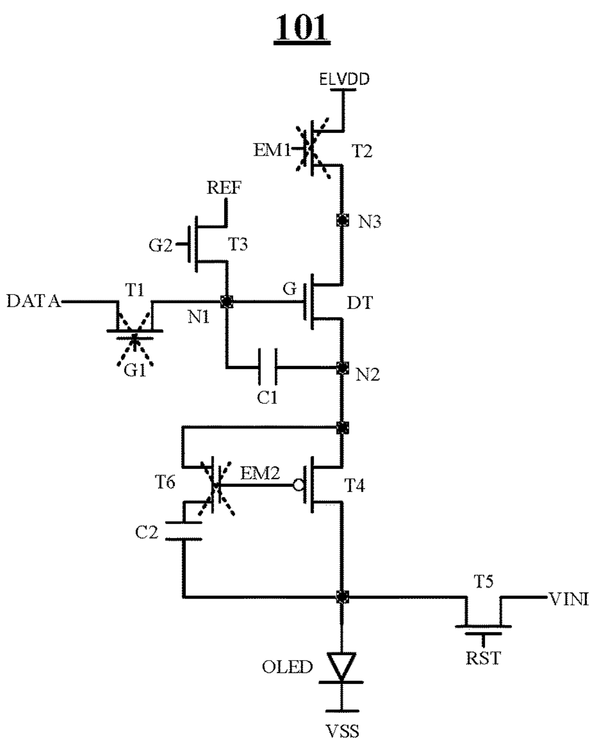
FIG. 2B is a schematic diagram of the pixel circuit as illustrated in FIG. 2A when it is in a reset stage.
Figure 2C:
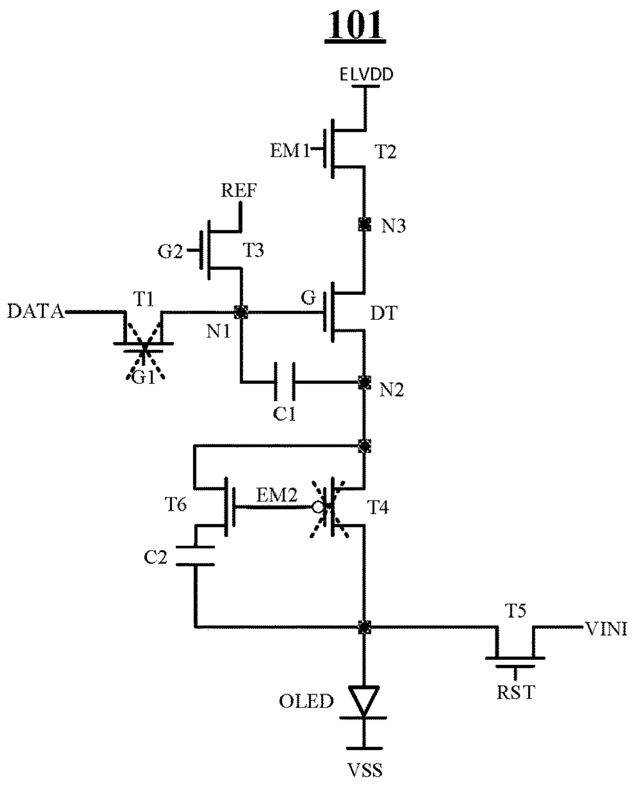
FIG. 2C is a schematic diagram of the pixel circuit as illustrated in FIG. 2A when it is in a compensation stage.
Figure 2D:
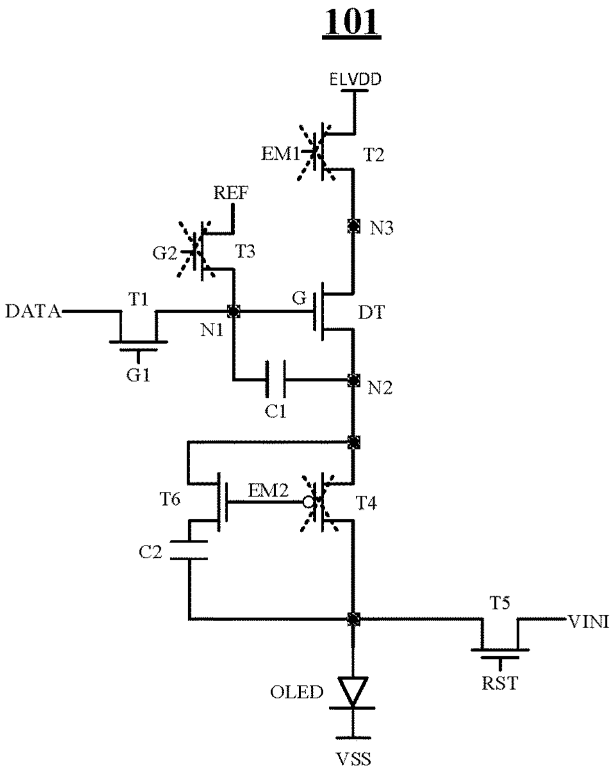
FIG. 2D is a schematic diagram of the pixel circuit as illustrated in FIG. 2A when it is in a data writing stage.
Figure 2E:
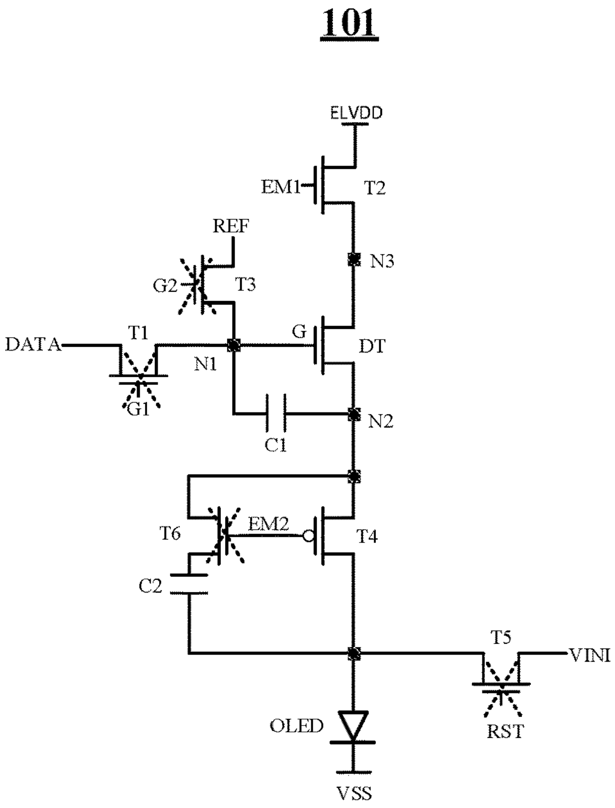
FIG. 2E is a schematic diagram of the pixel circuit as illustrated in FIG. 2A when it is in a light-emitting stage.

It should be noted that FIG. 2B is a schematic diagram of the pixel circuit as illustrated in FIG. 2A when it is in a reset stage; FIG. 2C is a schematic diagram of the pixel circuit as illustrated in FIG. 2A when it is in a compensation stage; FIG. 2D is a schematic diagram of the pixel circuit as illustrated in FIG. 2A when it is in a data writing stage; FIG. 2E is a schematic diagram of the pixel circuit as illustrated in FIG. 2A when it is in a light-emitting stage. In addition, the transistors marked with dotted lines in FIG. 2B to FIG. 2E all indicate that they are in a turn-off state during the corresponding stage.

For example, in the pixel circuit 101 illustrated in FIG. 2A, the driving transistor DT, the data writing transistor T1, the first light-emitting control transistor T2, the first compensation transistor T3, the reset transistor T5 and the first switching transistor T6 are all N-type transistors, that is, each transistor is turned on in the case where a high-level signal is applied to its gate electrode, and is turned off in the case where a low-level signal is applied to its gate electrode; the second light-emitting control transistor T4 is a P-type transistor, such as a low-temperature polysilicon thin film transistor, the second light-emitting control transistor T4 is turned on when its gate electrode is applied with a low-level signal, and is turned off when its gate electrode is applied with a high-level signal.

As illustrated in FIG. 2D, FIG. 2E, and FIG. 3, the embodiments of the present disclosure provide a driving method, including: in the data writing stage 3, making the second compensation control signal EM2 a turn-on signal to turn on the first switching transistor T6. Moreover, when entering the light-emitting stage 4 from the data writing stage 3, the second compensation control signal EM2 is changed from the turn-on signal to a turn-off signal to turn off the first switching transistor T6; in the light-emitting stage 4, the second compensation control signal EM2 is retained as the turn-off signal. When the first switching transistor T6 is switched from the turn-on state to the turn-off state, because a parasitic capacitance exists between the gate electrode of the first switching transistor T6 and the second electrode of the first switching transistor T6, a voltage of the second electrode of the first switching transistor T6 is decreased, which in turn causes a voltage of the first electrode of the driving transistor DT to decrease, for example, the voltage of the first electrode of the driving transistor DT decreases rapidly, thereby compensating the gate-source voltage Vgs of the driving transistor DT. At the same time, in the case where a voltage of the gate electrode of the driving transistor DT is decreased when the data writing transistor T1 is switched from the turn-on state to the turn-off state, a fluctuation of the gate-source voltage Vgs of the driving transistor DT can be reduced to improve the brightness uniformity of the display panel.

Specifically, for example, as illustrated in FIG. 1 and FIG. 3, in the reset stage 1, the driving method includes: making the first compensation control signal G2 a turn-on signal to turn on the first compensation circuit 300, so that the first compensation circuit 300 can apply the reference signal REF to the control terminal 100*m* of the driving circuit 100. At the same time, the second light-emitting control signal EM2 is a turn-on signal to turn on the second light-emitting control circuit 500, and the reset control signal RST is a turn-on signal to turn on the reset circuit 700. At this time, the reset signal VINI can be applied to the first electrode 600*a* of the light-emitting element 600 through the reset circuit 700, and the reset signal VINI can be applied to the first terminal 100*a* of the driving circuit 100 through the second light-emitting control circuit 500.

Correspondingly, as illustrated in FIG. 2B and FIG. 3, the first compensation control signal G2 and the reset control signal RST are high-level signals to turn on the first compensation transistor T3 and the reset transistor T5; the second light-emitting control signal EM2 is a low-level signal to turn on the second light-emitting control transistor T4. Therefore, the first compensation transistor T3 can apply the reference signal REF to the gate electrode of the driving transistor DT, and the reset signal VINI can be applied to the first electrode of the light-emitting element OLED through the reset transistor T5 and applied to the first electrode of the driving transistor DT through the second light-emitting control transistor T4. In the reset stage 1, for example, the reference signal REF is a reference voltage VREF, the reset signal VINI is a reset voltage VINI, wherein VREF−VINI>Vth. That is, the gate-source voltage Vgs of the driving transistor DT is larger than Vth, so that the driving transistor DT is in the turn-on state and the reset signal VINI is applied to the second node N2 (that is, applied to the first electrode of the light-emitting element OLED) and the third node N3, thereby realizing a reset operation of the second node N2 and the third node N3.

For example, as illustrated in FIG. 1 and FIG. 3, in the compensation stage 2, the driving method further includes: making the first light-emitting control signal EM1 a turn-on signal to turn on the first light-emitting control circuit 400, and the first light-emitting control circuit 400 applying the first power supply voltage ELVDD to the second terminal 100*b* of the driving circuit 100 to charge and compensate the driving circuit 100. The second compensation control signal is a turn-on signal to turn on the first switching transistor T6, and the second compensation circuit (for example, implemented as the first switching transistor T6 and the second storage capacitor C2) is configured to compensate the driving circuit 100 (implemented as the driving transistor DT) in response to the second compensation control signal.

Correspondingly, as illustrated in FIG. 2C and FIG. 3, in the compensation stage 2, the first light-emitting control signal EM1 and the first compensation control signal G2 are high-level signals, and the first light-emitting control transistor T2 and the first compensation transistor T3 are turned on. At the same time, the second light-emitting control signal EM2 and the reset control signal RST are high-level signals to turn on the first switching transistor T6 and the reset transistor T5. The first light-emitting control transistor T2 applies the first power supply voltage ELVDD to the second electrode of the driving transistor DT, the first compensation transistor T3 applies the reference signal REF to the gate electrode of the driving transistor DT, and the reset signal VINI is applied to the second electrode of the second storage capacitor C2.

For example, as illustrated in FIG. 2C, in the compensation stage 2, the reference signal REF is applied to the gate electrode of the driving transistor DT in the form of the reference voltage, so that a value Vg of the gate electrode voltage of the driving transistor DT is equal to the value Vref of the reference voltage. At the beginning of the compensation stage 2, a voltage value Vs of the first electrode of the driving transistor DT (that is, the second node N2) is equal to a value Vini of the reset voltage, and a value Vgs of a difference between the value Vref of the reference voltage and the value Vini of the reset voltage is greater than the threshold voltage Vth of the driving transistor DT, i.e., Vgs−Vth>0, so that the driving transistor DT is in the turn-on state. Because the first light-emitting control transistor T2 is in the turn-on state, the first power supply voltage ELVDD can be configured to charge the driving transistor DT until the driving transistor DT is turned off (closed), so that the voltage Vs of the first terminal of the driving transistor DT is equal to Vref−Vth, therefore, the charging process can make the threshold voltage Vth of the driving transistor DT and other information be stored in the first storage capacitor C1.

For example, as illustrated in FIG. 2C and FIG. 3, in compensation stage 2, the second electrode of the second storage capacitor C2 receives a constant voltage from a constant voltage terminal. In this embodiment, the second electrode of the second storage capacitor C2 is electrically connected to the first electrode of the light-emitting element OLED, and the first electrode of the reset transistor T5 is electrically connected to the first electrode of the light-emitting element OLED. For example, for the pixel circuit 101, because the reset transistor T5 is turned on in response to the reset control signal RST, the reset signal VINI serves as the above-mentioned constant voltage, thereby reducing a risk of the voltage of the first electrode of the driving transistor DT jumping because of interference from an external signal. In addition, the reset transistor T5 is in the turn-on state, which can make the voltage of the first electrode of the light-emitting element more stable and reduce the parasitic capacitance between the first electrode of the light-emitting element and other elements, thereby reducing a risk of occurring a phenomenon such as the light-emitting element emitting light in the compensation stage 2.

For example, as illustrated in FIG. 1 and FIG. 3, in the data writing stage 3, the driving method further includes: making the data scan signal G1 a turn-on signal to write the data signal DATA into the control terminal 100*m* of the driving circuit 100. As illustrated in FIG. 1, FIG. 2D, FIG. 2E and FIG. 3, when entering the light-emitting stage 4 from the data writing stage 3, the data scan signal G1 is switched from the turn-on signal to a turn-off signal, and the second compensation control signal EM2 is switched from a turn-on signal to a turn-off signal to simultaneously turn off the data writing circuit 200 and the first switching transistor T6; and in the light-emitting stage 4, the data scan signal G1 remains as a turn-off signal. Because the first switching transistor T6 shares the gate electrode with the second light-emitting control transistor T4 in this embodiment, the second compensation control signal serves as the second light-emitting control signal, and both are the same signal, therefore, in this embodiment, the second compensation control signal and the second light-emitting control signal are both represented by the symbol EM2.

Correspondingly, as illustrated in FIG. 2D and FIG. 3, in the data writing stage 3, the data scan signal G1, the reset control signal RST and the second light-emitting control signal EM2 are high-level signals to turn on the data writing transistor T1 and the reset transistor T5 and the first switching transistor T6. Therefore, the data writing transistor T1 writes the data signal DATA to the gate electrode of the driving transistor DT, for example, the data signal DATA may be a data voltage DATA, so that a value of the voltage of the gate electrode of the driving transistor DT is equal to a value of the data voltage Vdata. At the same time, a voltage of the second electrode of the driving transistor DT (third node N3) is the first power supply voltage ELVDD, and a voltage value of the first electrode of the driving transistor DT (second node N2) is $Vref-Vth+C1/(C1+C2)\times(Vdata-Vref)$. Here, for clarity of illustration, a value of the capacitance of the first storage capacitor uses the same symbol C1 with the first storage capacitor, and a value of the capacitance of the second storage capacitor uses the same symbol C2 with the value of the second storage capacitor.

Correspondingly, as illustrated in FIG. 2E and FIG. 3, in the light-emitting stage 4, the first light-emitting control signal EM1 is a high-level signal to turn on the first light-emitting control transistor T2; the second light-emitting control signal EM2 is a low-level signal to turn on the second light-emitting control transistor T4 and turn off the first switching transistor T6. The first switching transistor T6 and the second light-emitting control transistor T4 have opposite types, so that the second light-emitting control signal EM2 (that is, the second compensation control signal) received by the gate electrode shared by the two turns on one of the two and turn off the other. In this way, the driving current is applied to the light-emitting element through the second light-emitting control transistor T4 to make it emit light.

For example, as illustrated in FIG. 2E, in the light-emitting stage 4, the voltage value of the gate electrode of the driving transistor DT is Vdata, and the voltage value of the first electrode of the driving transistor DT (second node N2) is $Vref-Vth+C1/(C1+C2)\times(Vdata-Vref)$, the voltage of the second electrode of the driving transistor DT (third node N3) is the first power supply voltage ELVDD. Vgs of the driving transistor DT is equal to $Vdata-(Vref-Vth+C1/(C1+C2)\times(Vdata-Vref))$.

A value I of the driving current flowing through the light-emitting element can be obtained according to the following formula: $I=K\times(Vgs-Vth)^2$, K is a conductivity coefficient of the driving transistor DT, that is: $I=K\times((Vdata-Vref)\times Cst2/(Cst1+Cst2))^2$.

According to the above formula, it can be seen that the value I of the driving current flowing through the light-emitting element is no longer related to the threshold voltage Vth of the driving transistor DT; therefore, a compensation for the pixel circuit can be realized, and a problem of the shifting of the threshold voltage Vth of the driving transistor DT caused by a manufacturing process and long-term operation can be solved, and an impact of the threshold voltage Vth on the driving current can be eliminated, thereby improving the display effect of the display device adopting this pixel circuit.

For example, as illustrated in FIG. 2D and FIG. 2E, in the data writing stage 3, the data writing transistor T1 and the first switching transistor T6 are on the turned-on state, when entering the light-emitting stage 4 from the data writing stage 3, the data writing transistor T1 and the first switching transistor T6 are both turned on. The gate-source voltage Vgs of the driving transistor DT is equal to Vg−Vs, where Vg represents the gate voltage of the driving transistor DT, and Vs represents the voltage value of the first electrode of the driving transistor DT. Therefore, when the data writing transistor T1 is turned off, because a parasitic capacitance exists between the gate electrode of the data writing transistor T1 and its second electrode (the first node N1), the data writing transistor T1 may cause a voltage of the first node N1 to decrease when it is turned off, that is, the voltage Vg of the gate electrode of the driving transistor DT is reduced. When the first switching transistor T6 is turned off, because a parasitic capacitance exists between the gate electrode of the first switching transistor T6 and its second electrode (the second node N2), the voltage of the second node N2 can also be decreased when the first switching transistor T6 is turned off, that is, the value Vs of the voltage of the first electrode of the driving transistor DT is decreased, in this way, a difference between the voltage of the gate electrode of the driving transistor DT and the voltage of the first electrode of the driving transistor DT (that is, the gate-source voltage Vgs of the driving transistor DT) is basically unchanged or has small fluctuations, which is beneficial to making the driving current flowing through the light-emitting element more stable and making the brightness of the display panel more uniform.

With this arrangement, in the pixel circuit provided by the embodiment of the present application, the first light-emitting transistor T6 is combined with the second storage capacitor C2, the first storage capacitor C1 and other components, which not only solves the problem of how to compensate the threshold voltage of the driving transistor, but also solves the technical problem of unstable gate-source voltage of the driving transistors of a plurality of pixels due to the difficulty of rapidly decreasing the voltage of the first electrode of the driving transistor while the voltage of the gate electrode of the driving transistor decreases upon switching to the light-emitting stage.

For example, as illustrated in FIG. 2B to FIG. 2E, in each of the reset stage 1, the compensation stage 2, the data writing stage 3 and the lighting stage 4, the second compensation control signal and the second light-emitting control signal EM2 are opposite switching signals to control switching states of their corresponding circuits to be opposite. The second compensation control signal and the second light-emitting control signal EM2 are opposite switching signals means that situations of whether the first switching transistor T6 (or the second compensation circuit) is turned on in response to the second compensation control signal and whether the second light-emitting control transistor T4 (or the second light-emitting control circuit) is turned on in response to the second light-emitting control signal EM2 are opposite. For example, in the case where the second compensation control signal is a turn-on signal for the first switching transistor T6, the second light-emitting control signal EM2 is a turn-off signal for the first switching transistor T6; conversely, in the case where the second compensation control signal is a turn-off signal for the first switching transistor T6, the second light-emitting control signal EM2 is a turn-on signal for the second light-emitting control transistor T4.

For example, as illustrated in FIG. 2B to FIG. 2E, in the compensation stage 2 and the data writing stage 3, the second compensation control signal is a turn-on signal, and the first switching transistor T6 is in a turn-on state; the second light-emitting control signal is a turn-off signal, and the second light-emitting control transistor T4 is in a turn-off state, so that the driving circuit is compensated by the second compensation circuit. For example, in the reset stage 1 and the light-emitting stage 4, the second compensation control signal is a turn-off signal, and the first switching transistor T6 is in a turn-off state; the second light-emitting control signal is a turn-on signal, and the second light-emitting control transistor T4 is in a turn-on state; therefore, in the reset stage 1, the reset signal VINI is applied to the second node N2 through the second light-emitting control transistor T4, and in the light-emitting stage 4, the light-emitting element OLED is driven to emit light.

Therefore, as illustrated in FIG. 2B to FIG. 2E, for example, the first switching transistor T6 and the second light-emitting control transistor T4 can share the gate electrode, and by making the first switching transistor T6 and the second light-emitting control transistor T4 have opposite types, both are controlled by the second light-emitting control signal EM2. For example, the first switching transistor T6 and the second light-emitting control transistor T4 sharing a gate electrode means that the gate electrodes of the first switching transistor T6 and the second light-emitting control transistor T4 are electrically connected to the same gate line, that is, a common gate line. For example, in the case where the second light-emitting control signal EM2 is a high-voltage signal, the first switching transistor T6 is turned on and the second light-emitting control transistor T4 is turned off; in the case where the second light-emitting control signal EM2 is a low-voltage signal, the first switching transistor T6 is turned off, and the second light-emitting control transistor T4 is turned on, thereby making the structure of the pixel circuit simpler and the control method of the pixel circuit more convenient.

Figure 4:
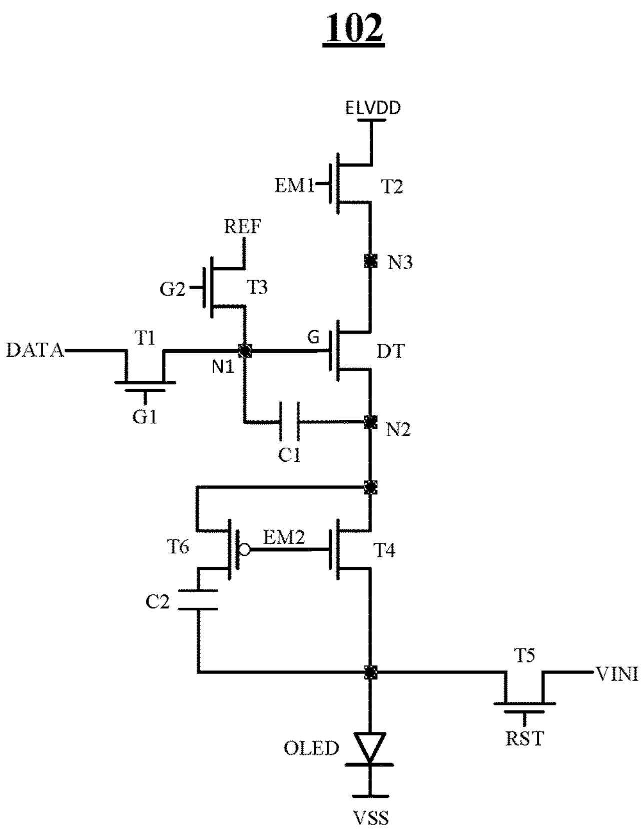
FIG. 4 is a circuit diagram of another implementation example of the pixel circuit illustrated in FIG. 1.
Figure 5:
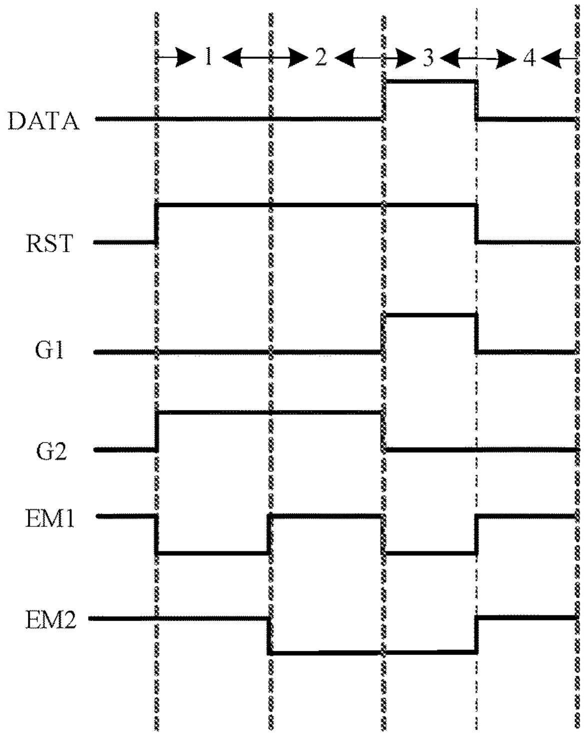
FIG. 5 is a signal timing diagram of another driving method provided by at least one embodiment of the present disclosure.

FIG. 4 is a circuit diagram of another implementation example of the pixel circuit illustrated in FIG. 1; FIG. 5 is a signal timing diagram of another driving method provided by at least one embodiment of the present disclosure.

For example, the pixel circuit illustrated in FIG. 1 can further be implemented as a pixel circuit structure illustrated in FIG. 4.

For example, as illustrated in FIG. 4, a pixel circuit 102 includes a driving transistor DT, a data writing transistor T1, a first light-emitting control transistor T2, a first compensation transistor T3, a second light-emitting control transistor T4, a reset transistor T5, a first switching transistor T6, a first storage capacitor C1, a second storage capacitor C2 and a light-emitting element.

For example, as illustrated in FIG. 4, in the pixel circuit 102, the first electrode of the first switching transistor T6 is electrically connected to the first electrode of the second storage capacitor C2, and the second electrode of the first switching transistor T6 is electrically connected to the second node N2. The second electrode of the second storage capacitor C2 is electrically connected to the first electrode of the light-emitting element OLED, and the first electrode of the reset transistor T5 is electrically connected to the first electrode of the light-emitting element OLED, so that the second electrode of the second storage capacitor C2 can receive the reset signal VINI through the reset transistor T5, and the reset signal VINI serves as the above-mentioned constant voltage. The gate electrode of the first switching transistor T6 is electrically connected to the gate electrode of the second light-emitting control transistor T4, the first switching transistor T6 and the second light-emitting control transistor T4 share the gate electrode, the second light-emitting control signal EM2 serves as the second compensation control signal, and the type of the first switching transistor T6 is different from the type of the second light-emitting control transistor T4.

For example, as illustrated in FIG. 4, the difference between the pixel circuit 102 and the pixel circuit 101 illustrated in FIG. 2A is that: the types of the first switching transistor T6 and the second light-emitting control transistor T4 are changed, and the other structures are the same. In the pixel circuit 102, the first switching transistor T6 is a P-type transistor, the first switching transistor T6 is turned on in the case where the gate electrode of it receives a low-level signal, and is turned off in the case where the gate electrode of it receives a high-level signal. The second light-emitting control transistor T4 is an N-type transistor, the second light-emitting control transistor T4 is turned on in the case where the gate electrode of it receives a high-level signal, and is turned off in the case where the gate electrode of it receives a low-level signal. For other structures in the pixel circuit 102, please refer to the relevant descriptions of the pixel circuit 101 illustrated in FIG. 2A in the above embodiments, which will not be repeated here.

For example, as illustrated in FIG. 4 and FIG. 5, during the driving process of the pixel circuit 102, the working state (for example, the turn-on state or the turn-off state) of each transistor is the same as that of the pixel circuit 101 illustrated in FIG. 2A. Compared with the timing diagram illustrated in FIG. 3, timing states of the data signal DATA, the reset control signal RST, the data scan signal G1, the first compensation control signal G2 and the first light-emitting control signal EM1 in FIG. 5 remain unchanged, the difference is that: the control signal of the second light-emitting control signal EM2 is different. For example, in the pixel circuit 102, because the second light-emitting control transistor T4 is an N-type transistor and the first switching transistor T6 is a P-type transistor, in the compensation stage 2 and the data writing stage 3, the second light-emitting control signal EM2 is a low-level signal, so that the first switching transistor T6 is in the turn-on state and the second light-emitting control transistor T4 is in the turn-off state, thereby facilitating compensation of the driving circuit through the second compensation circuit. In the reset stage 1 and the light-emitting stage 4, the second light-emitting control signal EM2 is a high-level signal, so that the second light-emitting control transistor T4 is in the turn-on state and the first switching transistor T6 is in the turn-off state, thereby facilitating the charging of the pixel circuit 102 and is beneficial for the light-emitting element to emit light.

For example, for the working process and corresponding technical effects in the case where the pixel circuit 102 illustrated in FIG. 4 is in the reset stage 1, the compensation stage 2, the data writing stage 3, or the light-emitting stage 4, please refer to the relevant descriptions for FIG. 2B to FIG. 2E in the above embodiments, which will not be repeated here.

Figure 6:
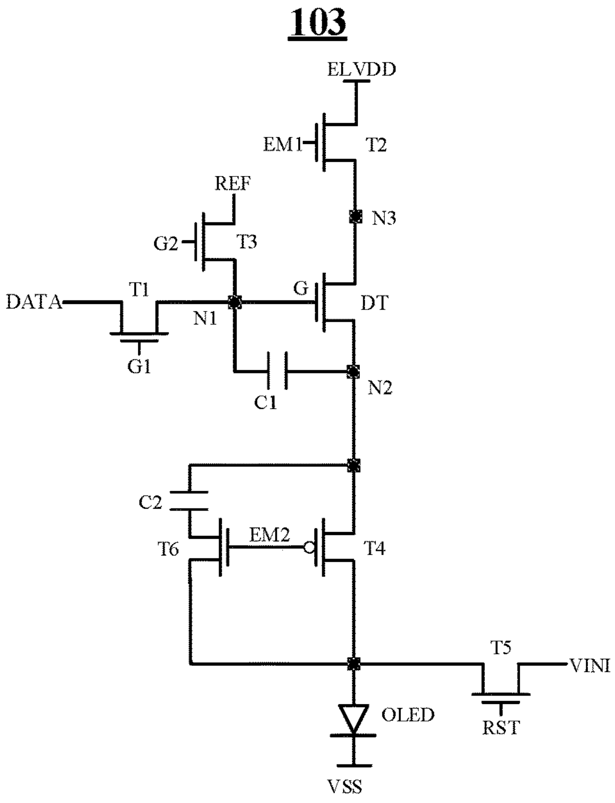
FIG. 6 is a circuit diagram of another implementation example of the pixel circuit illustrated in FIG. 1.

FIG. 6 is a circuit diagram of another implementation example of the pixel circuit illustrated in FIG. 1. For example, the pixel circuit illustrated in FIG. 1 can further be implemented as a pixel circuit structure illustrated in FIG. 6.

For example, as illustrated in FIG. 6, a pixel circuit 103 includes a driving transistor DT, a data writing transistor T1, a first light-emitting control transistor T2, a first compensation transistor T3, a second light-emitting control transistor T4, a reset transistor T5, a first switching transistor T6, a first storage capacitor C1, a second storage capacitor C2 and a light-emitting element.

For example, as illustrated in FIG. 6, in the pixel circuit 103, the gate electrode of the first switching transistor T6 is electrically connected to the gate electrode of the second light-emitting control transistor T4, and the first switching transistor T6 and the second light-emitting control transistor T4 share the gate electrode, the second light-emitting control signal EM2 serves as the second compensation control signal, and the type of the first switching transistor T6 is different from the type of the second light-emitting control transistor T4. The second electrode of the second storage capacitor C2 is electrically connected to the first electrode of the light-emitting element OLED, and the first electrode of the reset transistor T5 is electrically connected to the first electrode of the light-emitting element OLED.

For example, as illustrated in FIG. 6, the difference between the pixel circuit 103 and the pixel circuit 101 illustrated in FIG. 2A is that: in the pixel circuit 103, the first electrode of the second storage capacitor C2 is electrically connected to the second node N2, and the second electrode of the capacitor C2 is electrically connected to the first electrode of the first switching transistor T6. Therefore, the second electrode of the second storage capacitor C2 is electrically connected to the first electrode of the light-emitting element OLED through the first switching transistor T6, that is, the second electrode of the second storage capacitor C2 is indirectly connected to the first electrode of the light-emitting element OLED. For example, the first electrode of the second storage capacitor C2 is directly electrically connected to the second node N2, that is, no other components such as a transistor and a capacitor exist between the first electrode of the second storage capacitor C2 and the second node N2. For other structures in the pixel circuit 103, please refer to the relevant descriptions of the pixel circuit 101 illustrated in FIG. 2A in the above embodiments, which will not be repeated here.

For example, as illustrated in FIG. 6, during the driving process of the pixel circuit 103, the working state (for example, the turn-on state or the turn-off state) of each transistor is the same as that of the pixel circuit 101 illustrated in FIG. 2A. Therefore, a timing diagram corresponding to the pixel circuit 103 can also refer to FIG. 3. For example, for the working process and corresponding technical effects in the case where the pixel circuit 103 illustrated in FIG. 6 is in the reset stage 1, the compensation stage 2, the data writing stage 3 or the light-emitting stage 4, please refer to the relevant descriptions of FIG. 2B-FIG. 2E in the above embodiments, which will not be repeated here.

For example, as illustrated in FIG. 3 and FIG. 6, in the data writing stage 3, the data writing transistor T1 and the first switching transistor T6 are both in the turn-on state, when entering the light-emitting stage 4 from the data writing stage 3, the data writing transistor T1 and the first switching transistor T6 are both switched from the turn-on state to the turn-off state. The gate-source voltage Vgs of the driving transistor DT is equal to Vg−Vs, where Vg represents the voltage of the gate electrode of the driving transistor DT, and Vs represents the voltage value of the first electrode of the driving transistor DT. In the case where the data writing transistor T1 turns off, because a parasitic capacitance exists between the gate electrode of the data writing transistor T1 and its second electrode (the first node N1), the data writing transistor T1 may cause the voltage of the first node N1 to decrease when it turns off, that is, the voltage Vg of the gate electrode of the driving transistor DT is decreased. When the first switching transistor T6 is switched from the turn-on state to the turn-off state, because a parasitic capacitance exists between the gate electrode of the first switching transistor T6 and its first electrode (the second electrode of the second storage capacitor C2), the voltage of the second electrode of the second storage capacitor C2 can also be reduced when the first switching transistor T6 is turned off. Because a voltage between two electrodes of the second storage capacitor C2 will not change suddenly, in the case where the voltage of the second electrode of the second storage capacitor C2 decreases, the voltage of the first electrode of the second storage capacitor C2 also decreases. Therefore, the voltage of the first electrode of the driving transistor DT decreases accordingly, so that the difference between the gate voltage of the driving transistor DT and the voltage of the first electrode of the driving transistor DT (for example, the gate-source voltage Vgs of the driving transistor DT) is basically unchanged, or has small fluctuations, which is beneficial to making the driving current flowing through the light-emitting element more stable and making the brightness of the display panel more uniform.

Figure 7:
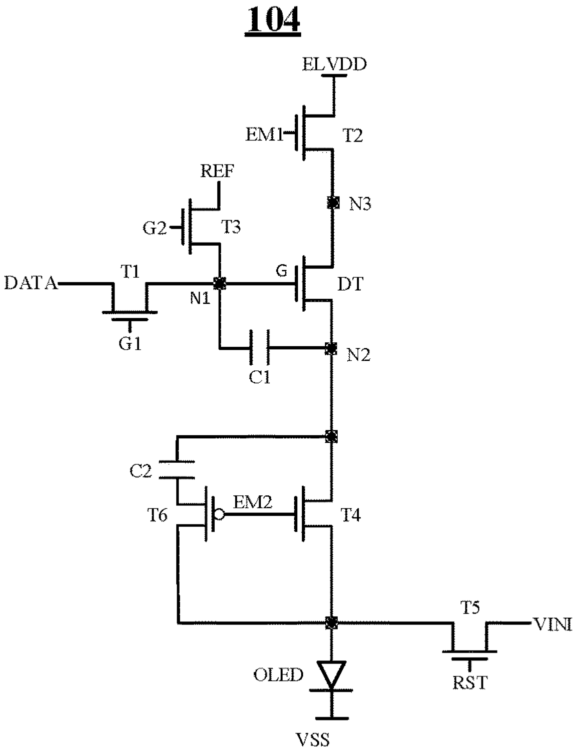
FIG. 7 is a circuit diagram of another implementation example of the pixel circuit illustrated in FIG. 1.

FIG. 7 is a circuit diagram of another implementation example of the pixel circuit illustrated in FIG. 1. For example, the pixel circuit illustrated in FIG. 1 can further be implemented as a pixel circuit structure illustrated in FIG. 7.

For example, as illustrated in FIG. 7, a pixel circuit 104 includes a driving transistor DT, a data writing transistor T1, a first light-emitting control transistor T2, a first compensation transistor T3, a second light-emitting control transistor T4, a reset transistor T5, a first switching transistor T6, a first storage capacitor C1, a second storage capacitor C2 and a light-emitting element.

For example, as illustrated in FIG. 7, in the pixel circuit 104, the gate electrode of the first switching transistor T6 is electrically connected to the gate electrode of the second light-emitting control transistor T4, and the first switching transistor T6 and the second light-emitting control transistor T4 share the gate electrode, the second light-emitting control signal EM2 serves as the second compensation control signal, and the type of the first switching transistor T6 is different from the type of the second light-emitting control transistor T4. The second electrode of the second storage capacitor C2 is electrically connected to the first electrode of the light-emitting element OLED, and the first electrode of the reset transistor T5 is electrically connected to the first electrode of the light-emitting element OLED. At the same time, in the pixel circuit 104, the first electrode of the second storage capacitor C2 is electrically connected to the second node N2, and the second electrode of the second storage capacitor C2 is electrically connected to the first electrode of the first switching transistor T6, so that the second electrode of the second storage capacitor C2 is electrically connected to the first electrode of the light-emitting element OLED through the first switching transistor T6.

For example, as illustrated in FIG. 7, the difference between the pixel circuit 104 and the pixel circuit 103 illustrated in FIG. 6 is that: the types of the first switching transistor T6 and the second light-emitting control transistor T4 are changed, and the other structures are the same. In the pixel circuit 104, the first switching transistor T6 is a P-type transistor, the first switching transistor T6 is turned on in the case where the gate electrode of it receives a low-level signal, and is turned off in the case where the gate electrode of it receives a high-level signal. The second light-emitting control transistor T4 is an N-type transistor, the second light-emitting control transistor T4 is turned on in the case where the gate electrode of it receives a high-level signal, and is turned off in the case where the gate electrode of it receives a low-level signal. For other structures in the pixel circuit 104, please refer to the relevant descriptions of the pixel circuit 103 illustrated in FIG. 6 in the above embodiments, which will not be repeated here.

For example, as illustrated in FIG. 7, during the driving process of the pixel circuit 104, the working states (for example, the turn-on state or the turn-off state) of each transistor is the same as that of the pixel circuit 103 illustrated in FIG. 6. Compared with the timing diagram illustrated in FIG. 6, the timing states of the data signal DATA, the reset control signal RST, the data scan signal G1, the first compensation control signal G2 and the first light-emitting control signal EM1 remain unchanged, the difference is that: the control signal of the second light-emitting control signal EM2 is different. Therefore, the timing diagram corresponding to the pixel circuit 104 can also refer to FIG. 5. For example, for the working process and corresponding technical effects of the pixel circuit 104 illustrated in FIG. 7 in the reset stage 1, the compensation stage 2, the data writing stage 3 and the light-emitting stage 4, the relevant descriptions, please refer to FIG. 2B to FIG. 2E in the above embodiments, which will not be repeated here.

For example, as illustrated in FIG. 2A, FIG. 4, FIG. 6 and FIG. 7, in the case where the first switching transistor T6 and the second light-emitting control transistor T4 share the gate electrode, the second light-emitting control signal EM2 serves as the second compensation control signal, and the type of the first switching transistor T6 and the type of the second light-emitting control transistor T4 are different, the type of the first switching transistor T6 and the type of the second light-emitting control transistor T4 can be reasonably selected according to design requirements. For example, in the case where the first switching transistor T6 is a P-type transistor, the second light-emitting control transistor T4 may be an N-type transistor. For example, in the case where the first switching transistor T6 is an N-type transistor, the second light-emitting control transistor T4 can be a P-type transistor, thereby making the structure of the pixel circuit more flexible.

Figure 8:
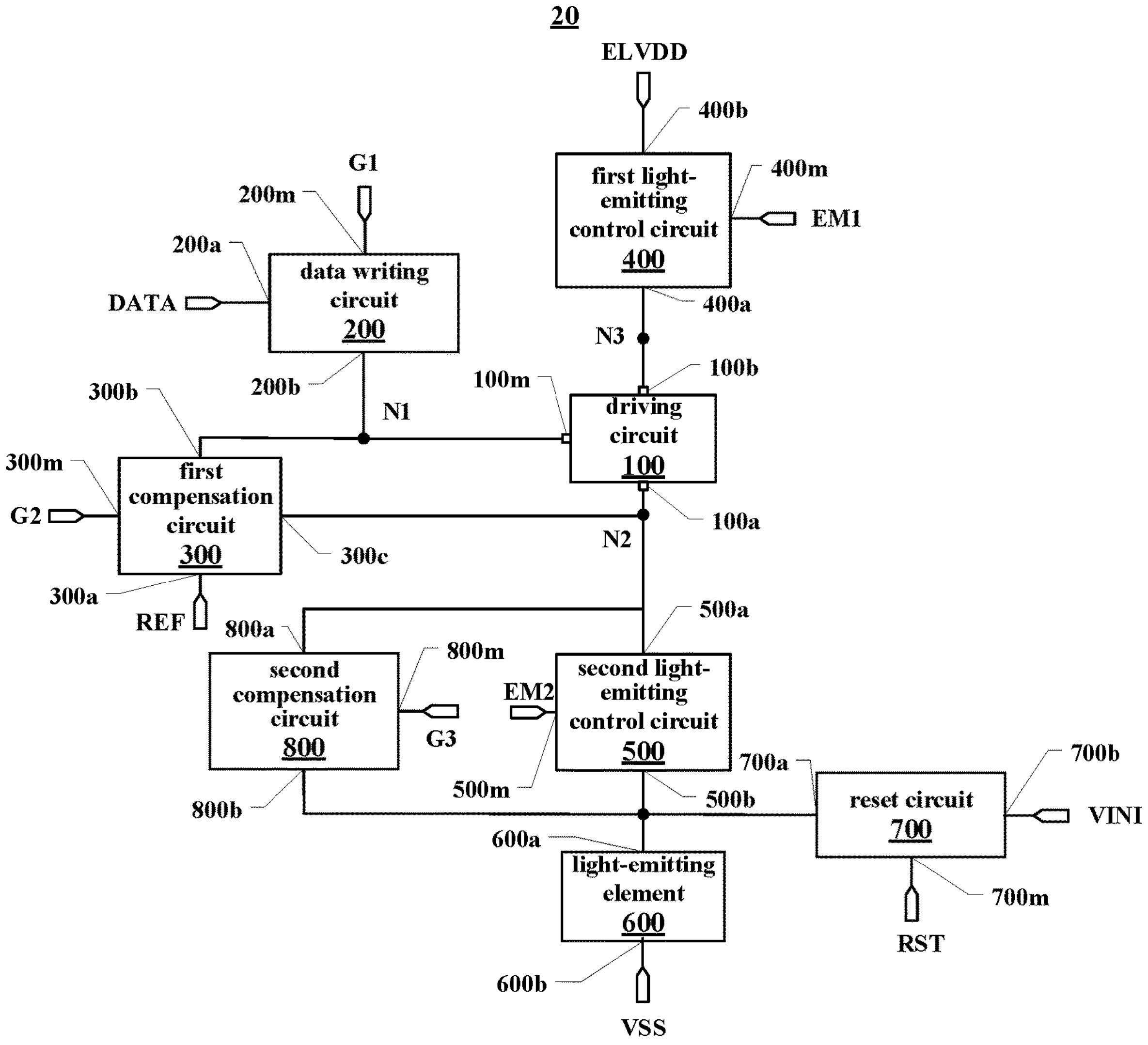
FIG. 8 is a schematic block diagram of another pixel circuit provided by at least one embodiment of the present disclosure.

FIG. 8 is a schematic block diagram of another pixel circuit provided by at least one embodiment of the present disclosure.

For example, as illustrated in FIG. 8, the pixel circuit 20 includes a driving circuit 100, a data writing circuit 200, a first compensation circuit 300, a first light-emitting control circuit 400, a second light-emitting control circuit 500, a light-emitting element 600, a reset circuit 700 and a second compensation circuit 800. Compared with the pixel circuit 10 illustrated in FIG. 1, the difference of the pixel circuit 20 is that: the control terminal 500*m* of the second light-emitting control circuit 500 and the control terminal 800*m* of the second compensation circuit 800 are independent of each other and are not connected. The control terminal 800*m* of the second compensation circuit 800 is configured to receive the second compensation control signal G3, and the control terminal 500*m* of the second light-emitting control circuit 500 is configured to receive the second light-emitting control signal EM2. The second compensation control signal G3 is different from the second light-emitting control signal EM2, for example, the two can be electrically connected to different signal output terminals as independent control signals. For other structures in the pixel circuit 20, please refer to the relevant descriptions of FIG. 1 in the above embodiments, which will not be repeated here.

Figure 9:
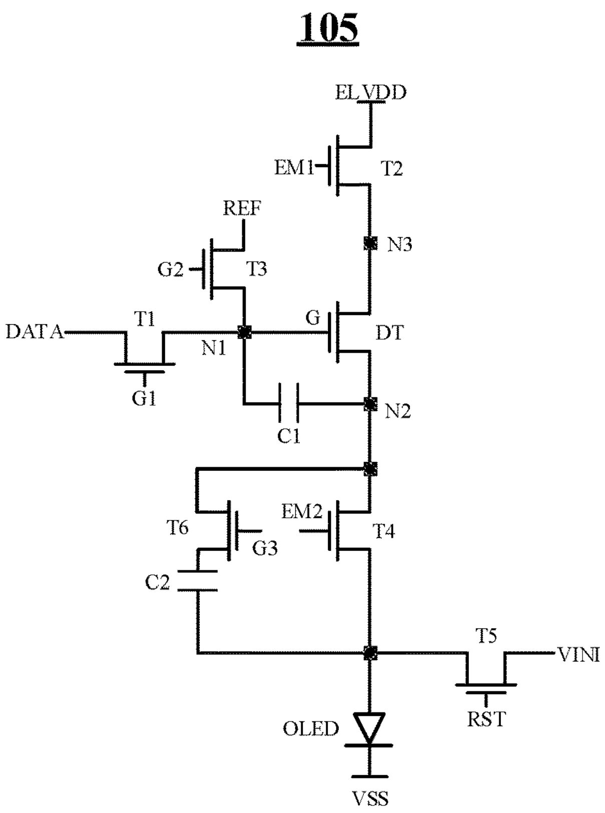
FIG. 9 is a circuit diagram of an implementation example of the pixel circuit illustrated in FIG. 8.
Figure 10:
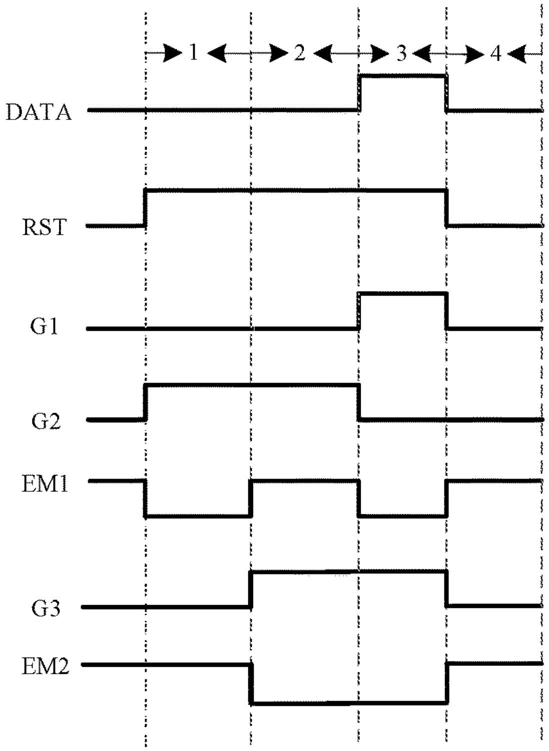
FIG. 10 is a signal timing diagram of another driving method provided by at least one embodiment of the present disclosure.

FIG. 9 is a circuit diagram of an implementation example of the pixel circuit illustrated in FIG. 8; FIG. 10 is a signal timing diagram of another driving method provided by at least one embodiment of the present disclosure.

For example, the pixel circuit illustrated in FIG. 8 can be implemented as a pixel circuit structure illustrated in FIG. 9.

For example, as illustrated in FIG. 9, a pixel circuit 105 includes a driving transistor DT, a data writing transistor T1, a first light-emitting control transistor T2, a first compensation transistor T3, a second light-emitting control transistor T4, a reset transistor T5, a first switching transistor T6, a first storage capacitor C1, a second storage capacitor C2 and a light-emitting element.

For example, as illustrated in FIG. 9, in the pixel circuit 105, the first electrode of the first switching transistor T6 is electrically connected to the first electrode of the second storage capacitor C2, and the second electrode of the first switching transistor T6 is electrically connected to the second node N2. The second electrode of the second storage capacitor C2 is electrically connected to the first electrode of the light-emitting element OLED, and the first electrode of the reset transistor T5 is electrically connected to the first electrode of the light-emitting element OLED.

For example, as illustrated in FIG. 9, the difference between the pixel circuit 105 and the pixel circuit 101 illustrated in FIG. 2A is that: the gate electrode of the first switching transistor T6 and the gate electrode of the second light-emitting control transistor T4 are independent of each other and are not electrically connected. For example, the gate electrode of the first switching transistor T6 is configured to receive the second compensation control signal G3, and the gate electrode of the second light-emitting control transistor T4 is configured to receive the second light-emitting control signal EM2. Therefore, both of the first switching transistor T6 and the second light-emitting control transistor T4 can be controlled individually, so that the pixel circuit 105 has a more flexible control method. In addition, the first switching transistor T6 and the second light-emitting control transistor T4 are of the same type, and both are N-type transistors. Of course, in other embodiments, the type of the first switching transistor T6 and the type of the second light-emitting control transistor T4 may be different, as long as the first switching transistor T6 and the second light-emitting control transistor T4 are controlled to be in the required turn-on state or turn-off state by the second compensation control signal G3 and the second light-emitting control signal EM2 that are controlled independently of each other as needed.

For example, a timing diagram corresponding to the pixel circuit 105 can refer to FIG. 10. For example, as illustrated in FIG. 9 and FIG. 10, during the driving process of the pixel circuit 105, the working state (for example, the on state or the off state) of each transistor is the same as that of the pixel circuit 101 illustrated in FIG. 2A, except that the type of the first switching transistor T6 is the same as that of the second light-emitting control transistor T4. Compared with the timing diagram illustrated in FIG. 3, the timing states of the data signal DATA, the reset control signal RST, the data scan signal G1, the first compensation control signal G2 and the first light-emitting control signal EM1 in the timing diagram in FIG. 10 remain unchanged, the difference is that the control signal of the second light-emitting control signal EM2 is different, and a timing state of the second compensation control signal G3 is added. For example, in the pixel circuit 105, because the second light-emitting control transistor T4 and the first switching transistor T6 are both N-type transistors, in the compensation stage 2 and the data writing stage 3, the second light-emitting control signal EM2 is a low-level signal, so that the second light-emitting control transistor T4 is in the turn-off state; the second compensation control signal G3 is a high-level signal, so that the first switching transistor T6 is in the turn-on state. In the reset stage 1 and the light-emitting stage 4, the second light-emitting control signal EM2 is a high-level signal, so that the second light-emitting control transistor T4 is in the turned-on state; the second compensation control signal G3 is a low-level signal, so that the first switching transistor T6 is in a turned-off state, which is beneficial for charging the pixel circuit 102 and the light-emitting element to emit light.

For example, for the working process and corresponding technical effects in the case where the pixel circuit 105 illustrated in FIG. 9 is in the reset stage 1, the compensation stage 2, the data writing stage 3 and the light-emitting stage 4, the relevant descriptions please refer to FIG. 2B to FIG. 2E in the above embodiments, which will not be repeated here.

For example, in some embodiments of the present disclosure, referring to the pixel circuit 105 illustrated in FIG. 9, the type of the second light-emitting control transistor T4 and the type of the first switching transistor T6 may be different, which can be set according to design requirements.

Figure 11A:
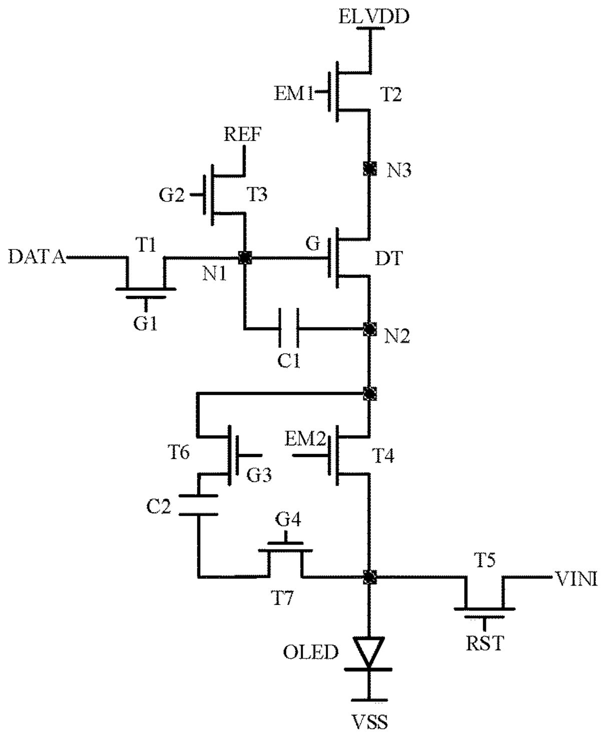
FIG. 11A is a circuit diagram of another implementation example of the pixel circuit illustrated in FIG. 8.
Figure 11B:
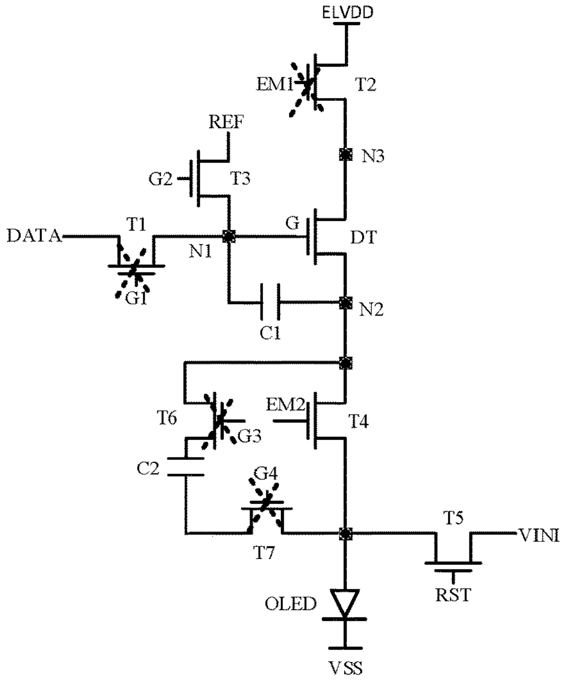
FIG. 11B is a schematic diagram of the pixel circuit illustrated in FIG. 11A when it is in a reset stage.
Figure 11C:
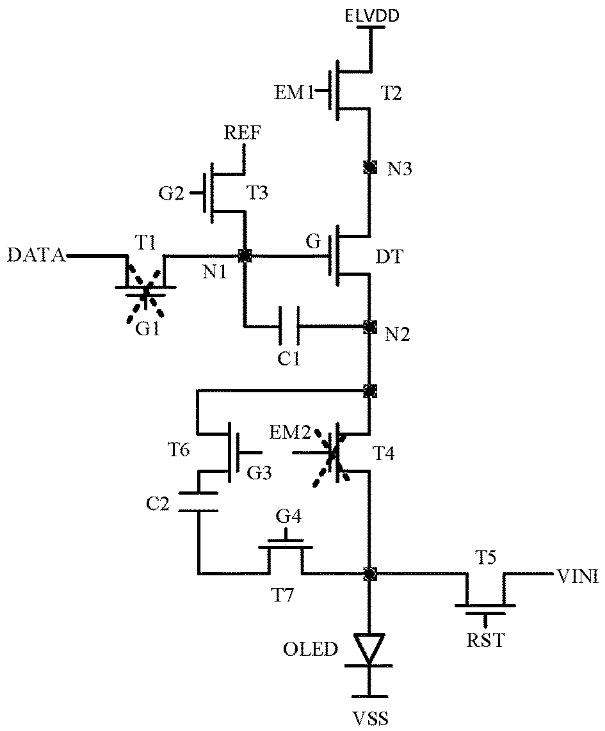
FIG. 11C is a schematic diagram of the pixel circuit illustrated in FIG. 11A when it is in a compensation stage.
Figure 11D:
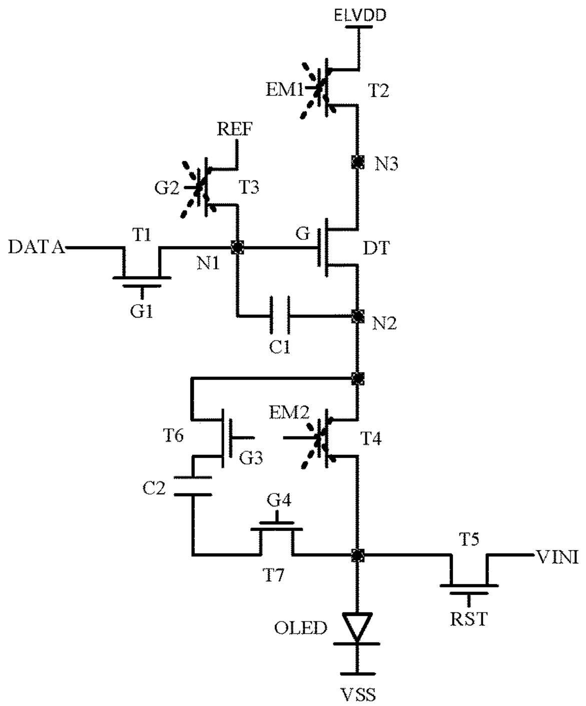
FIG. 11D is a schematic diagram of the pixel circuit illustrated in FIG. 11A when it is in a data writing stage.
Figure 11E:
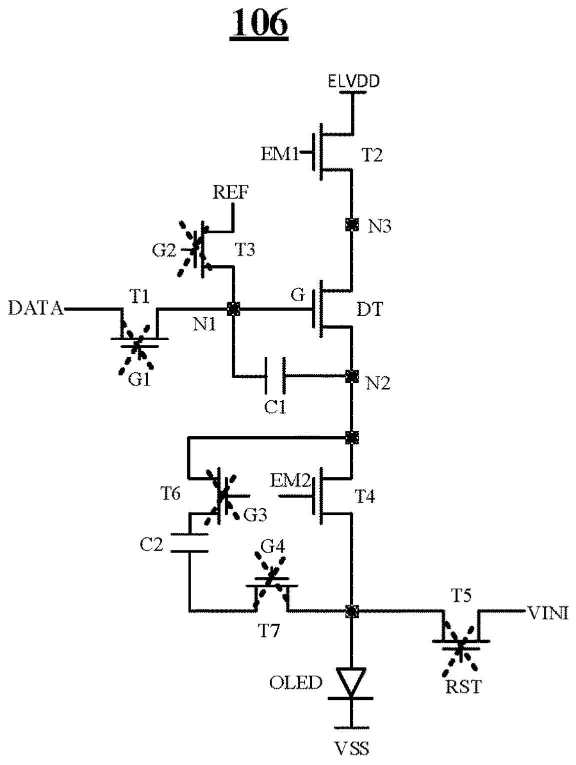
FIG. 11E is a schematic diagram of the pixel circuit illustrated in FIG. 11A when it is in a light-emitting stage.
Figure 12:
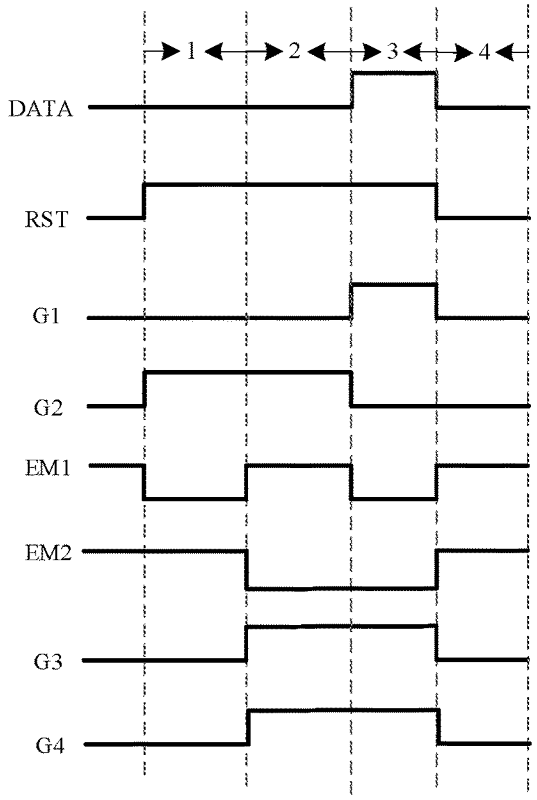
FIG. 12 is a signal timing diagram of another driving method provided by at least one embodiment of the present disclosure.

FIG. 11A is a circuit diagram of another implementation example of the pixel circuit illustrated in FIG. 8; FIG. 12 is a signal timing diagram of another driving method provided by at least one embodiment of the present disclosure; FIG. 11B is a schematic diagram of the pixel circuit illustrated in FIG. 11A when it is in a reset stage. FIG. 11C is a schematic diagram of the pixel circuit illustrated in FIG. 11A when it is in a compensation stage. FIG. 11D is a schematic diagram of the pixel circuit illustrated in FIG. 11A when it is in a data writing stage. FIG. 11E is a schematic diagram of the pixel circuit illustrated in FIG. 11A when it is in a light-emitting stage. In addition, the transistors marked with dotted lines in FIG. 11B to FIG. 11E all indicate that they are in a turn-off state in the corresponding stage.

For example, the pixel circuit illustrated in FIG. 8 can further be implemented as a pixel circuit structure illustrated in FIG. 11A.

For example, as illustrated in FIG. 11A, the pixel circuit 106 includes a driving transistor DT, a data writing transistor T1, a first light-emitting control transistor T2, a first compensation transistor T3, a second light-emitting control transistor T4, a reset transistor T5, a first switching transistor T6, a second switching transistor T7, a first storage capacitor C1, a second storage capacitor C2 and a light-emitting element.

For example, as illustrated in FIG. 11A, in the pixel circuit 106, the first electrode of the first switching transistor T6 is electrically connected to the first electrode of the second storage capacitor C2, and the second electrode of the first switching transistor T6 is electrically connected to the second node N2. The second electrode of the second storage capacitor C2 is electrically connected to the first electrode of the light-emitting element OLED, and the first electrode of the reset transistor T5 is electrically connected to the first electrode of the light-emitting element OLED.

For example, as illustrated in FIG. 11A, the difference between the pixel circuit 106 and the pixel circuit 105 illustrated in FIG. 9 is that: the second compensation circuit 800 (referring to FIG. 8) further includes a second switching transistor T7, the second electrode of the second storage capacitor C2 is electrically connected to the first electrode of the second switching transistor T7, and the second electrode of the second switching transistor T7 is electrically connected to the first electrode of the light-emitting element OLED, so that the second electrode of the second storage capacitor C2 is indirectly connected to the first electrode of the light-emitting element OLED. For example, a gate electrode of the second switching transistor T7, the gate electrode of the first switching transistor T6 and the gate electrode of the second light-emitting control transistor T4 are independent of each other and are not electrically connected. Of course, in other embodiments, in the case where the switching transistor T7 is provided, the first switching transistor T6 and the second light-emitting control transistor T4 may share the gate electrode. The gate electrode of the second switching transistor T7 is configured to receive a third compensation control signal G4. Therefore, the first switching transistor T6, the second switching transistor T7 and the second light-emitting control transistor T4 can be controlled individually, so that the pixel circuit 106 has a more flexible control method. In addition, the type of the first switching transistor T6, the type of the second switching transistor T7, and the type of the second light-emitting control transistor T4 are all the same, and they are all N-type transistors, the embodiments of the present disclosure include but are not limited thereto.

For example, as illustrated in FIG. 11A and FIG. 12, a corresponding timing diagram of the pixel circuit 106 can refer to FIG. 12. For example, during the driving process of the pixel circuit 106, compared with the timing diagram illustrated in FIG. 10, the timing states of the data signal DATA, the reset control signal RST, the data scan signal G1, the first compensation control signal G2, the first light-emitting control signal EM1, the second light-emitting control signal EM2 and the second compensation control signal G3 in the timing diagram in FIG. 12 are all the same, the different is that a timing state of the third compensation control signal G4 is added.

For example, as illustrated in FIG. 11B and FIG. 11E, in the pixel circuit 106, because the second switching transistor T7 is an N-type transistor, in the reset stage 1 and the light-emitting stage 4, the third compensation control signal G4 is a low-level signal, so that the second switching transistor T7 is in a turn-off state, which is beneficial for charging the pixel circuit 106 and the light-emitting element to emit light. For example, as illustrated in FIG. 11C and FIG. 11D, the third compensation control signal G4 is a high-level signal, so that the second switching transistor T7 is in a turn-on state, thereby facilitating to compensate the driving circuit by the second compensation circuit.

For example, for the specific working process and corresponding technical effects in the case where the pixel circuit 105 illustrated in FIG. 11B to FIG. 11E is in the reset stage 1, the compensation stage 2, the data writing stage 3 and the light-emitting stage 4, please refer to the relevant descriptions of FIG. 2B-FIG. 2E in the above embodiments, which will not be repeated here.

For example, as illustrated in FIG. 11B and FIG. 11E, in the reset stage 1 and the light-emitting stage 4, because the first switching transistor T6 and the second switching transistor T7 are both in the turn-off state, the first electrode and the second electrode of the second storage capacitor C2 are disconnected from other components in the pixel circuit 106, thereby reducing a parasitic capacitance between the second storage capacitor C2 and other component in the pixel circuit 106, and reducing a risk of circuit failure. By adding the second switching transistor T7, on the one hand, a constant voltage can be supplied to the second electrode of the second storage capacitor C2 at a specific time by controlling the turn-on and turn-off states of the second switching transistor T7; on the other hand, by making the second switching transistor T7 and the first switching transistor T6 be turned off at the same time, reliability that both the first electrode and the second electrode of the second storage capacitor C2 are disconnected from other components in the pixel circuit 106 can be ensured.

Figure 13:
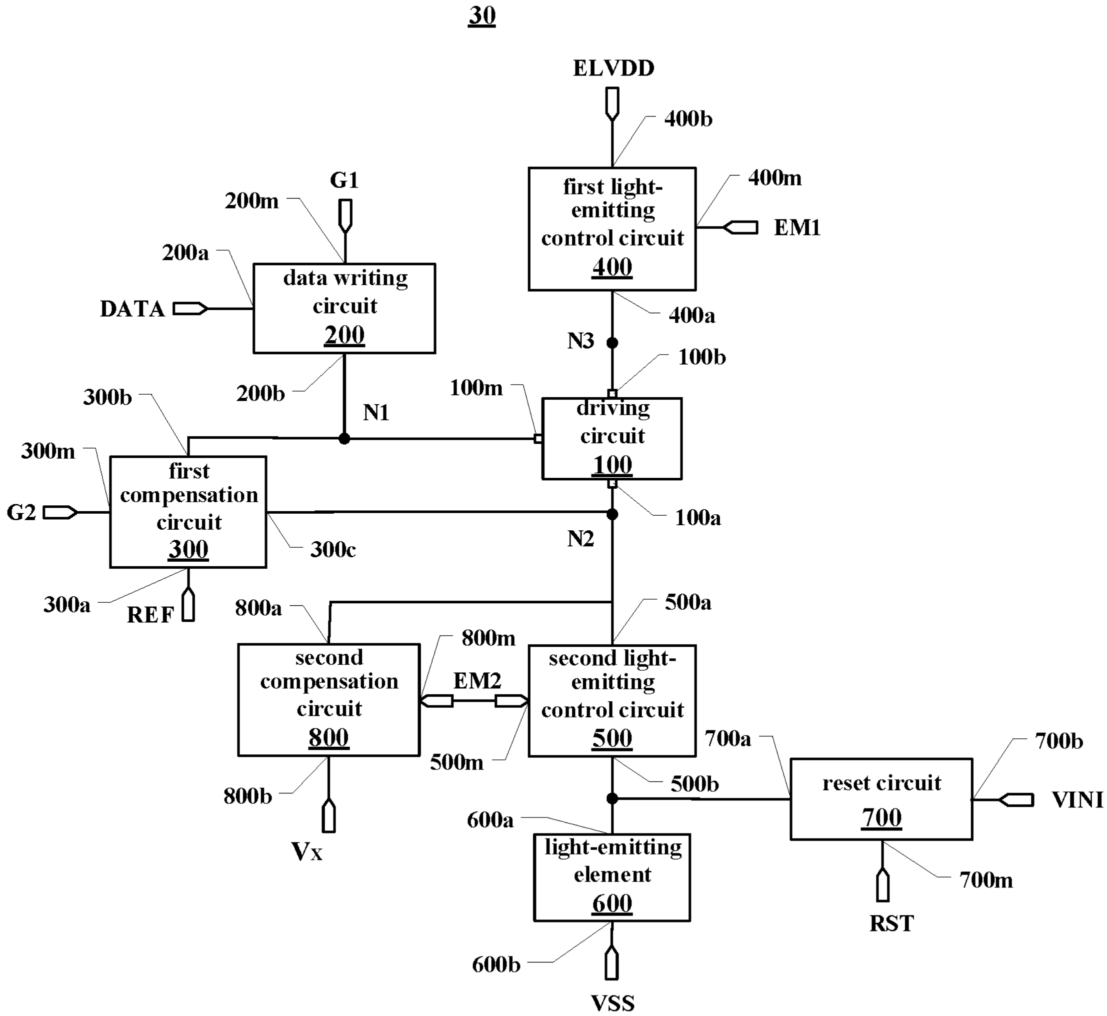
FIG. 13 is a schematic block diagram of another pixel circuit provided by at least one embodiment of the present disclosure.

FIG. 13 is a schematic block diagram of another pixel circuit provided by at least one embodiment of the present disclosure.

For example, as illustrated in FIG. 13, the pixel circuit 30 includes a driving circuit 100, a data writing circuit 200, a first compensation circuit 300, a first light-emitting control circuit 400, a second light-emitting control circuit 500, a light-emitting element 600, a reset circuit 700 and a second compensation circuit 800. Compared with the pixel circuit 10 illustrated in FIG. 1, the difference of the pixel circuit 30 is that the second terminal 800*b* of the second compensation circuit 800 is configured to receive a constant voltage Vx from a constant voltage terminal Vx. For example, the constant voltage terminal Vx serves as an independent signal input terminal, so that the constant voltage Vx can be independently controlled. For other structures in the pixel circuit 30, please refer to the relevant descriptions of FIG. 1 in the above embodiments, which will not be repeated here.

Figure 14:
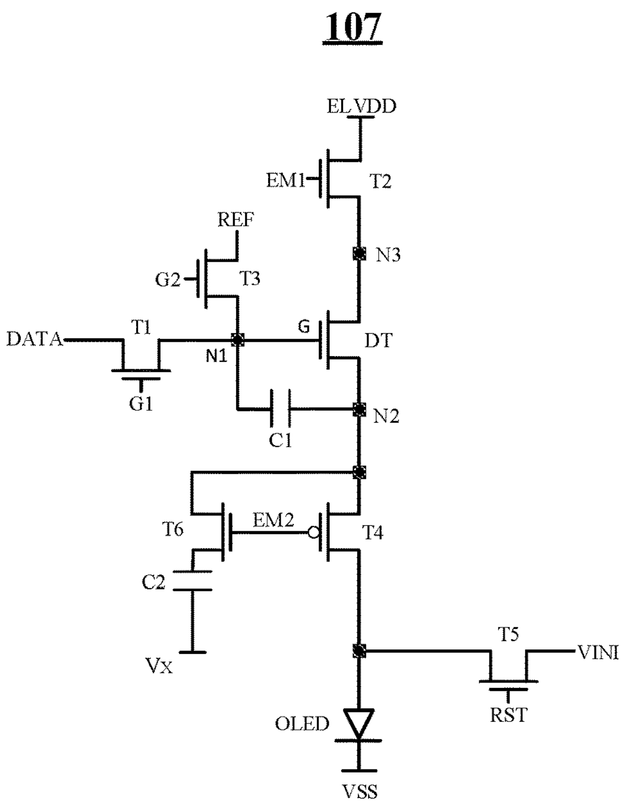
FIG. 14 is a circuit diagram of an implementation example of the pixel circuit illustrated in FIG. 13.

FIG. 14 is a circuit diagram of an implementation example of the pixel circuit illustrated in FIG. 13.

For example, the pixel circuit illustrated in FIG. 13 can be implemented as a pixel circuit structure illustrated in FIG. 14.

For example, as illustrated in FIG. 14, a pixel circuit 107 includes a driving transistor DT, a data writing transistor T1, a first light-emitting control transistor T2, a first compensation transistor T3, a second light-emitting control transistor T4, a reset transistor T5, a first switching transistor T6, a first storage capacitor C1, a second storage capacitor C2 and a light-emitting element.

For example, as illustrated in FIG. 14, in the pixel circuit 107, the first electrode of the first switching transistor T6 is electrically connected to the first electrode of the second storage capacitor C2, and the second electrode of the first switching transistor T6 is electrically connected to the second node N2, thereby allowing the second storage capacitor C2 to be indirectly electrically connected to the second node N2. The first electrode of the reset transistor T5 is electrically connected to the first electrode of the light-emitting element OLED. For example, as illustrated in FIG. 14, the difference between the pixel circuit 107 and the pixel circuit 101 illustrated in FIG. 2A is that: the second electrode of the second storage capacitor C2 is electrically connected to the constant voltage terminal Vx to receive the constant voltage Vx from the constant voltage terminal Vx.

For example, as illustrated in FIG. 14, a timing diagram corresponding to the pixel circuit 107 can refer to FIG. 3. For example, during the driving process of the pixel circuit 107, the working state (for example, the turn-on state or the turn-off state) of each transistor is the same as that of the pixel circuit 101 illustrated in FIG. 2A. For example, for the working process of the pixel circuit 107 illustrated in FIG. 14 in the case where it is in the reset stage 1, the compensation stage 2, the data writing stage 3 and the light-emitting stage 4, please refer to the relevant descriptions of FIG. 2B to FIG. 2E in the above embodiments, which will not be repeated here.

For example, as illustrated in FIG. 14, in the reset stage 1 and the light-emitting stage 4, the first switching transistor T6 is in a turn-off state, thereby causing the second storage capacitor C2 to be disconnected from other elements in the pixel circuit 107, thereby reducing a parasitic capacitance between the second storage capacitor C2 and other component in the pixel circuit 107 to reduce a risk of circuit failure.

Figure 15:
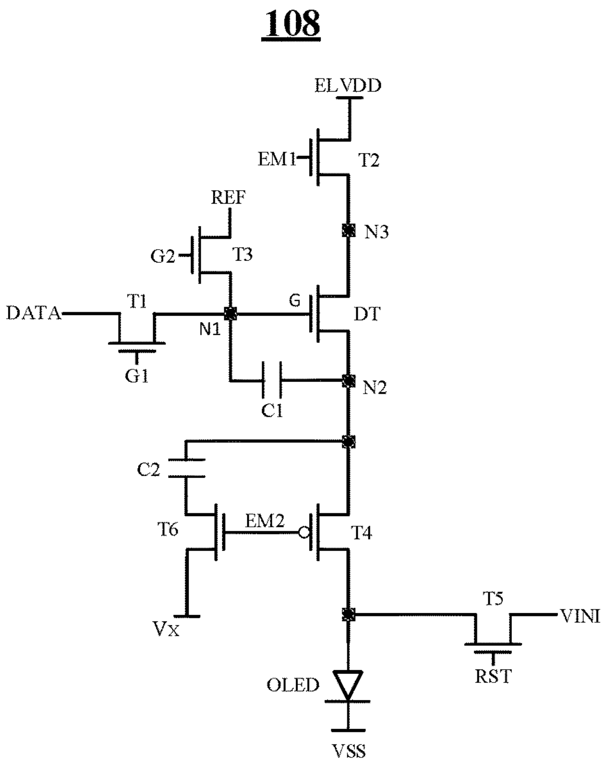
FIG. 15 is a circuit diagram of another implementation example of the pixel circuit illustrated in FIG. 13.

FIG. 15 is a circuit diagram of another implementation example of the pixel circuit illustrated in FIG. 13. For example, the pixel circuit illustrated in FIG. 13 can further be implemented as a pixel circuit structure illustrated in FIG. 15.

For example, as illustrated in FIG. 15, the pixel circuit 108 includes a driving transistor DT, a data writing transistor T1, a first light-emitting control transistor T2, a first compensation transistor T3, a second light-emitting control transistor T4, a reset transistor T5, a first switching transistor T6, a first storage capacitor C1, a second storage capacitor C2 and a light-emitting element.

For example, as illustrated in FIG. 15, the difference between the pixel circuit 108 and the pixel circuit 101 illustrated in FIG. 2A is that: the first electrode of the second storage capacitor C2 is electrically connected to the second node N2, and the second electrode of the second storage capacitor C2 is electrically connected to the first electrode of the first switching transistor T6, and the second electrode of the first switching transistor T6 is electrically connected to the constant voltage terminal Vx.

For example, as illustrated in FIG. 15, the timing diagram corresponding to the pixel circuit 108 can refer to FIG. 3. For example, during the driving process of the pixel circuit 108, the working state (for example, the turn-on state or the turn-off state) of each transistor is the same as that of the pixel circuit 101 illustrated in FIG. 2A. For example, for the working process of the pixel circuit 108 illustrated in FIG. 15 when it is in the reset stage 1, the compensation stage 2, the data writing stage 3 and the light-emitting stage 4, please refer to the relevant descriptions of FIG. 2B to FIG. 2E in the above embodiments, which will not be repeated here.

For example, as illustrated in FIG. 15, the first electrode of the second storage capacitor C2 can be directly electrically connected to the second node N2, in the data writing stage 3, the data writing transistor T1 and the first switching transistor T6 are both in the turn-on state, when entering the light-emitting stage 4 from the data writing stage 3, both the data writing transistor T1 and the first switching transistor T6 are switched to the turn-off state. When the first switching transistor T6 is switched to the turn-off state, because a parasitic capacitance exists between the gate electrode of the first switching transistor T6 and its first electrode (the second electrode of the second storage capacitor C2), the voltage of the second electrode of the second storage capacitor C2 can be reduced when the first switching transistor T6 turns off. Because a voltage between two electrodes of the second storage capacitor C2 will not change suddenly, in the case where the voltage of the second electrode of the second storage capacitor C2 decreases, the voltage of the first electrode of the second storage capacitor C2 also decreases. Therefore, the voltage of the first electrode of the driving transistor DT decreases accordingly, so that the difference between the gate voltage of the driving transistor DT and the voltage of the first electrode of the driving transistor DT (that is, the Vgs of the driving transistor DT) is basically unchanged, or has small fluctuations, which is beneficial to making the driving current flowing through the light-emitting element more stable and making the brightness of the display panel more uniform.

Figure 16:
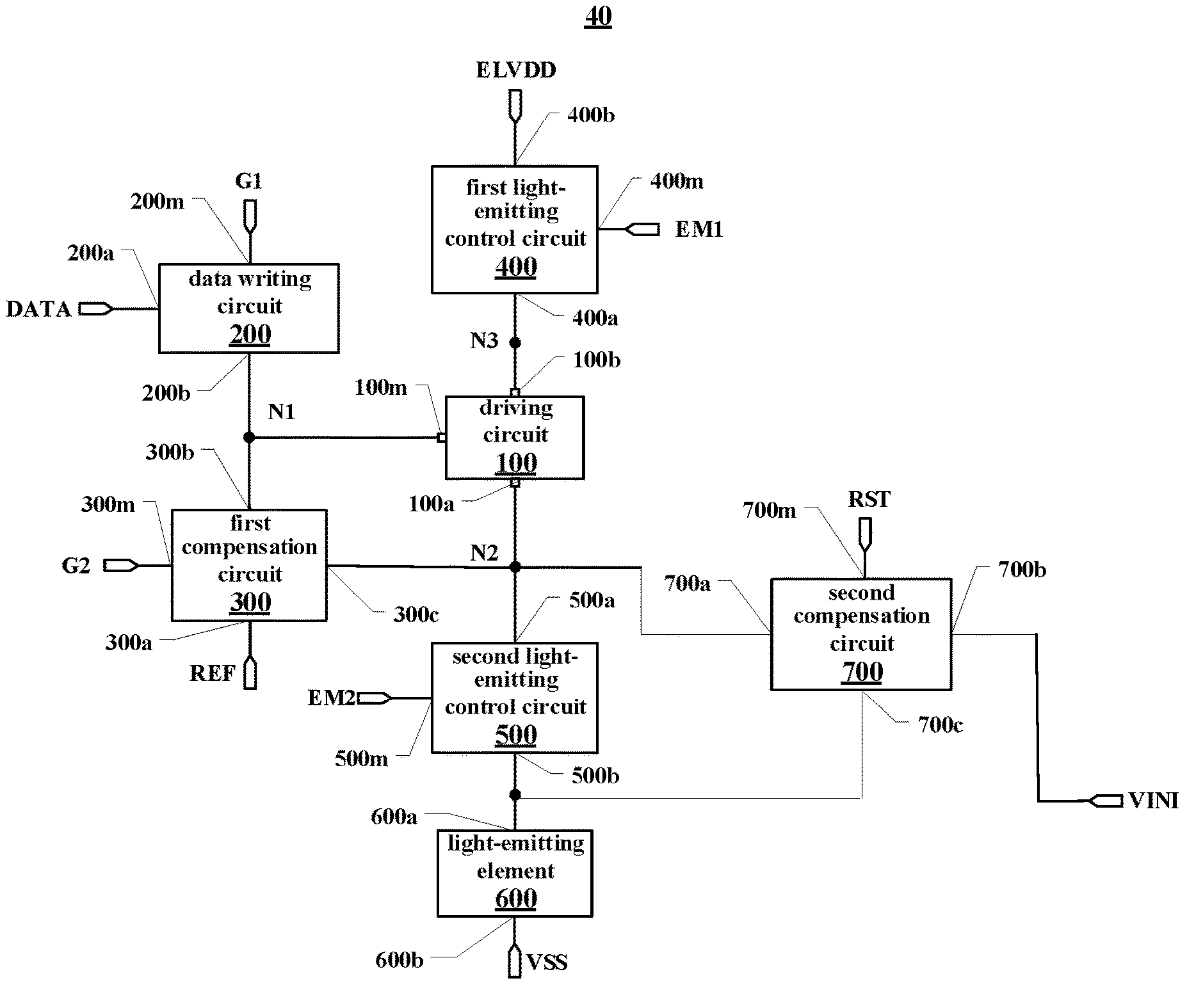
FIG. 16 is a schematic block diagram of another pixel circuit provided by at least one embodiment of the present disclosure.

FIG. 16 is a schematic block diagram of another pixel circuit provided by at least one embodiment of the present disclosure.

For example, as illustrated in FIG. 16, a pixel circuit 40 includes a driving circuit 100, a data writing circuit 200, a first compensation circuit 300, a first light-emitting control circuit 400, a second light-emitting control circuit 500, a light-emitting element 600 and a second compensation circuit 700. For example, compared with the pixel circuit 10 illustrated in FIG. 1, the difference of the pixel circuit 40 is that the second compensation circuit 700 is different, for the other structures, please refer to the relevant descriptions of FIG. 1 in the above embodiment, which will not be repeated here.

For example, as illustrated in FIG. 16, the second compensation circuit 700 includes a control terminal 700*m*, a first terminal 700*a*, a second terminal 700*b*, and a third terminal 700*c*. The control terminal 700*m* of the second compensation circuit 700 is configured to receive the reset control signal RST, the first terminal 700*a* of the second compensation circuit 700 is electrically connected to the second node N2, the second terminal 700*b* of the second compensation circuit 700 is connected to the reset signal terminal VINI to receive the reset signal VINI, and the third terminal 700*c* of the second compensation circuit 700 is electrically connected to the first electrode of the light-emitting element OLED. For example, the second compensation circuit 700 is configured to compensate the driving circuit 100; in addition, the second compensation circuit 700 is further multiplexed as a reset circuit and is configured to reset the driving circuit 100 and the light-emitting element OLED.

Figure 17A:
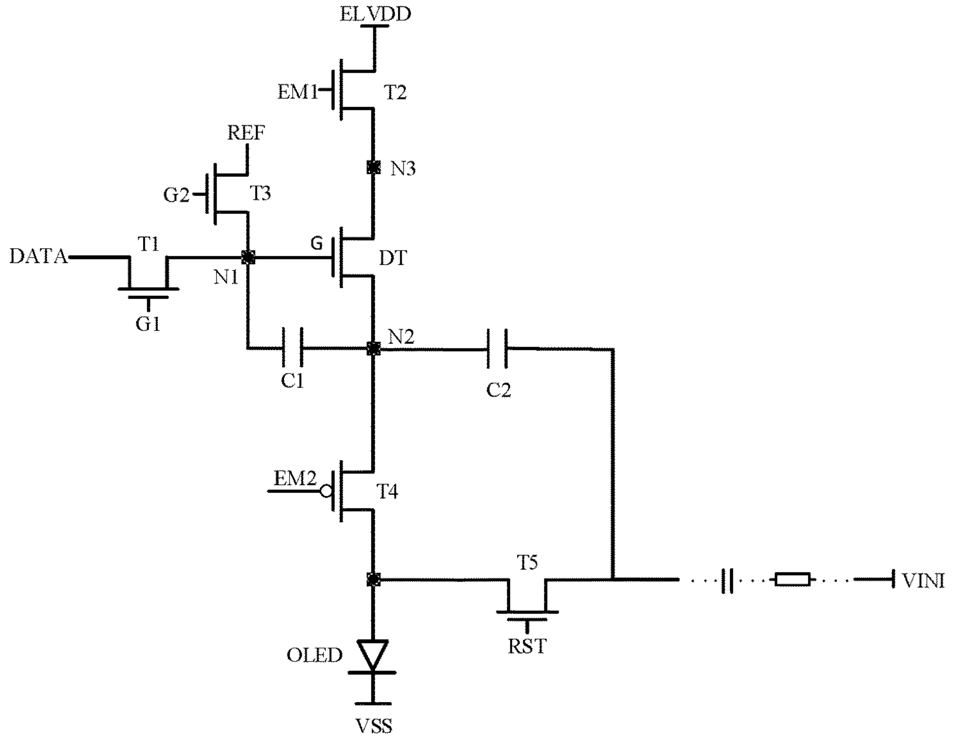
FIG. 17A is a circuit diagram of an implementation example of the pixel circuit illustrated in FIG. 16.

FIG. 17A is a circuit diagram of an implementation example of the pixel circuit illustrated in FIG. 16. For example, the pixel circuit illustrated in FIG. 16 can be implemented as a pixel circuit structure illustrated in FIG. 17A.

For example, as illustrated in FIG. 17A, a pixel circuit 109 includes a driving transistor DT, a data writing transistor T1, a first light-emitting control transistor T2, a first compensation transistor T3, a second light-emitting control transistor T4, a reset transistor T5, a first storage capacitor C1, a second storage capacitor C2 and a light-emitting element. For example, compared with the pixel circuit 101 illustrated in FIG. 2A, the difference of the pixel circuit 109 is that: the reset transistor T5 is multiplexed as the first switching transistor, and a connection method of the second storage capacitor C2 is different, the other structures can refer to the relevant descriptions of FIG. 2A in the above embodiment, which will not be repeated here.

For example, as illustrated in FIG. 16 and FIG. 17A, in the pixel circuit 109, the reset transistor T5 can be multiplexed as the first switching transistor, so that the second compensation circuit 700 is implemented as the reset transistor T5 and the second storage capacitor C2, at this time, the second compensation circuit 700 is configured to compensate the driving circuit 100 in response to the second compensation control signal. The reset control signal RST serves as the second compensation control signal, and the reset signal terminal VINI electrically connected to the second electrode of the reset transistor T5 serves as a constant voltage terminal to provide the above-mentioned constant voltage. The first electrode of the second storage capacitor C2 is electrically connected to the second node N2, and the second electrode of the second storage capacitor C2 is electrically connected to the second electrode of the reset transistor T5 to be electrically connected to the reset signal terminal VINI.

For example, as illustrated in FIG. 16 and FIG. 17A, in the pixel circuit 109, the second compensation circuit 700 can further serve as a reset circuit to reset the driving circuit 100 and the light-emitting element OLED, the reset circuit can be implemented as the reset transistor T5. The gate electrode of the reset transistor T5 is electrically connected to the reset control terminal RST to receive the reset control signal RST, a first electrode of the reset transistor T5 is electrically connected to the first electrode of the light-emitting element OLED, the second electrode of the reset transistor T5 is electrically connected to the reset signal terminal VINI to receive the reset signal VINI. For example, according to design requirements, some resistive elements or capacitive elements may further be provided between the second electrode of the reset transistor T5 and the reset signal terminal VINI, which is not limited in the embodiments of the present disclosure.

Figure 17B:
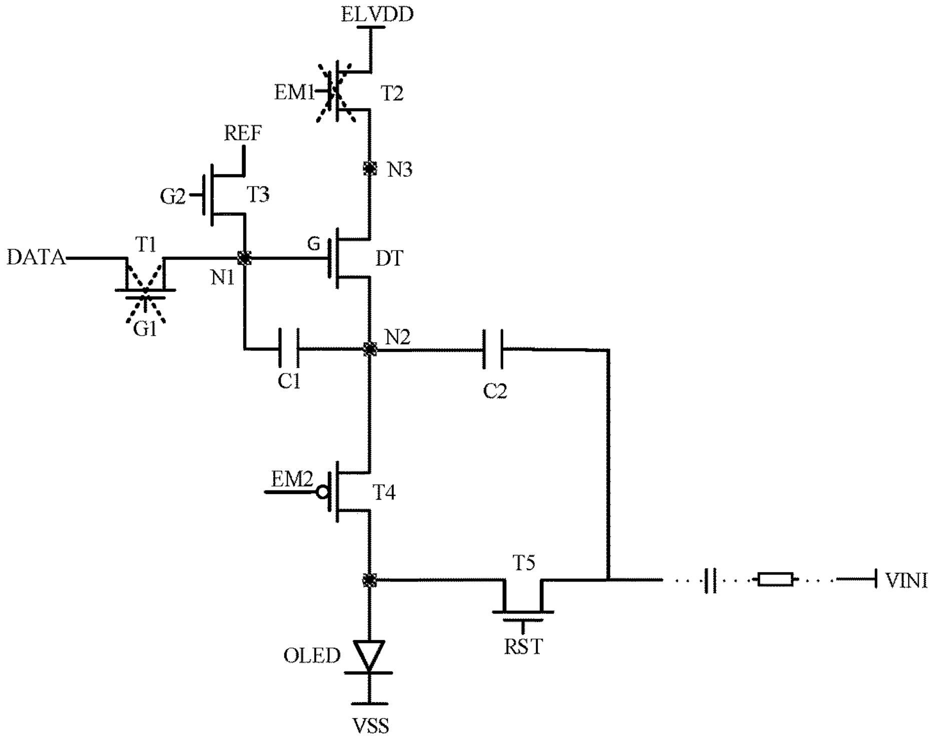
FIG. 17B is a schematic diagram of the pixel circuit illustrated in FIG. 17A when it is in a reset stage.
Figure 17C:
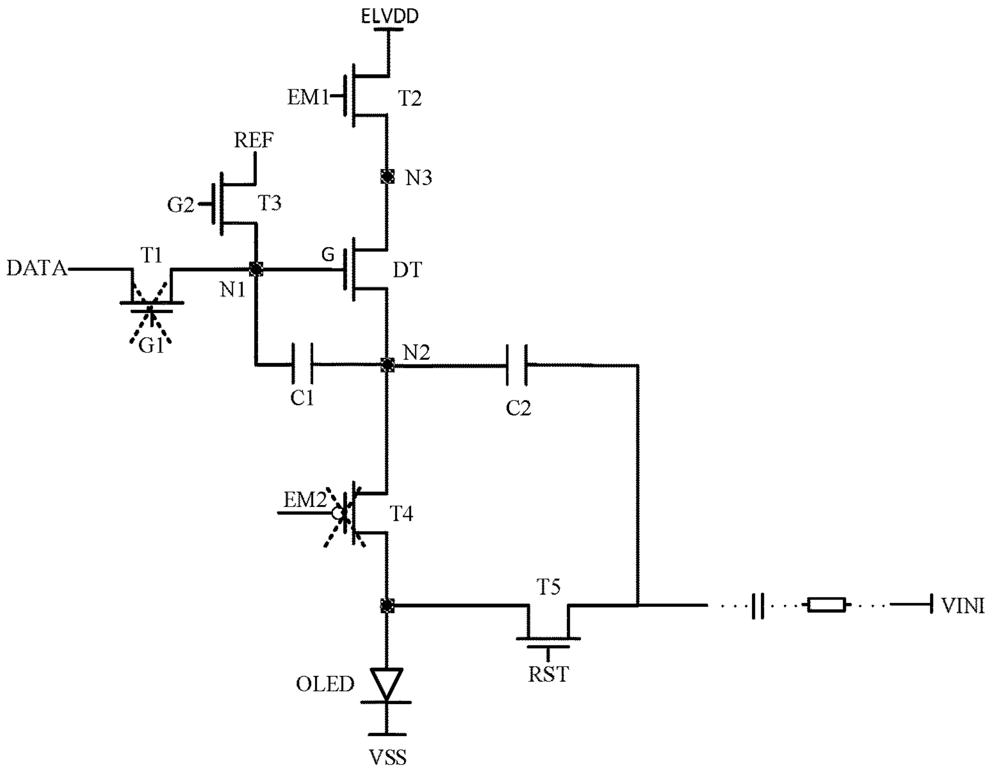
FIG. 17C is a schematic diagram of the pixel circuit illustrated in FIG. 17A when it is in a compensation stage.
Figure 17D:
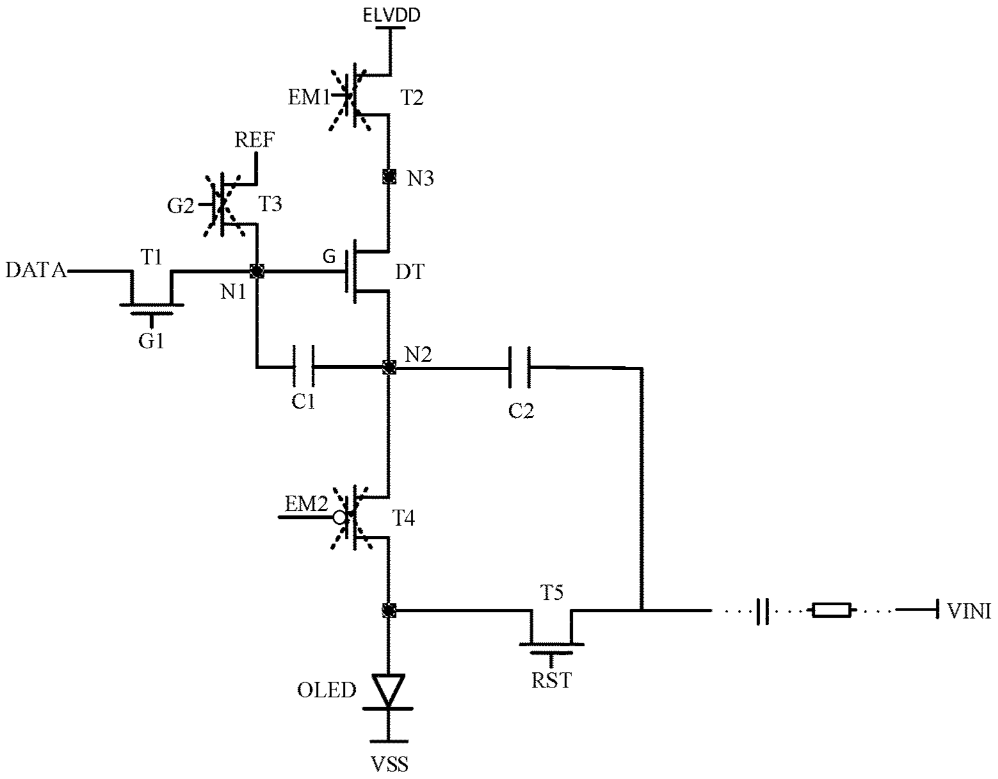
FIG. 17D is a schematic diagram of the pixel circuit illustrated in FIG. 17A when it is in a data writing stage.
Figure 17E:
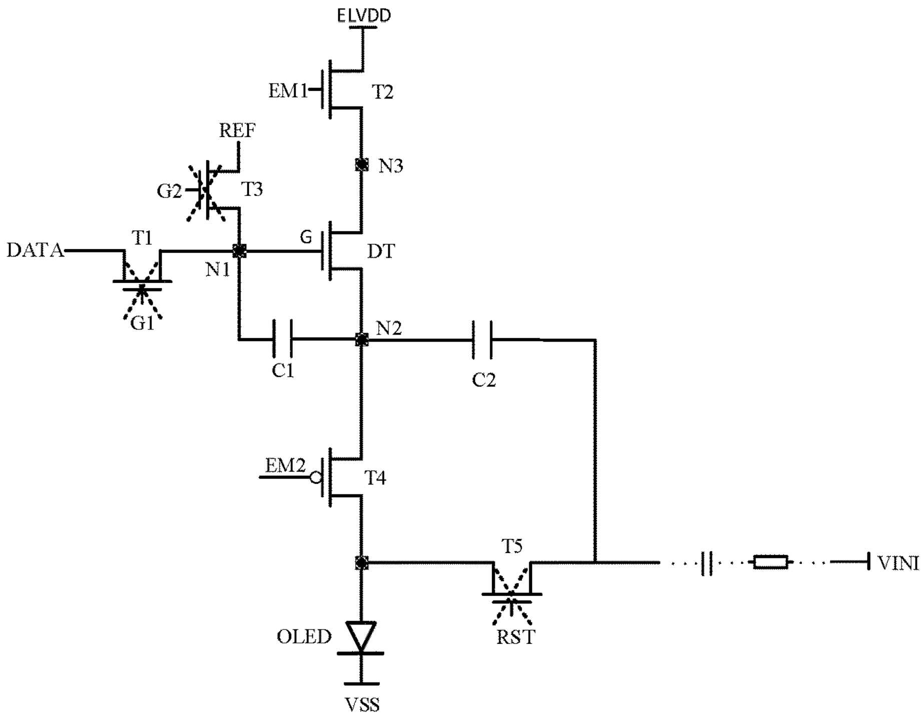
FIG. 17E is a schematic diagram of the pixel circuit illustrated in FIG. 17A when it is in a light-emitting stage.

FIG. 17B is a schematic diagram of the pixel circuit illustrated in FIG. 17A when it is in a reset stage. FIG. 17C is a schematic diagram of the pixel circuit illustrated in FIG. 17A when it is in a compensation stage. FIG. 17D is a schematic diagram of the pixel circuit illustrated in FIG. 17A when it is in a data writing stage. FIG. 17E is a schematic diagram of the pixel circuit illustrated in FIG. 17A when it is in a light-emitting stage. In addition, the transistors marked with dotted lines in FIG. 17B to FIG. 17E all indicate that they are in a turn-off state during the corresponding stage.

For example, a timing diagram corresponding to the pixel circuit 109 can refer to FIG. 3. For example, as illustrated in FIG. 17B to FIG. 17E and FIG. 3, in each of the reset stage 1, the compensation stage 2, the data writing stage 3 and the light-emitting stage 4, the working states of the driving transistor DT, the data writing transistor T1, the first light-emitting control transistor T2, the first compensation transistor T3, the second light-emitting control transistor T4, the reset transistor T5, the first storage capacitor C1, the second storage capacitor C2 and the light-emitting element in the pixel circuit 109 are all the same as the working states of the corresponding components in the pixel circuit 101 in FIG. 2A.

For example, as illustrated in FIG. 17B, in the reset stage 1, the reset transistor T5 is in the turn-on state, and the reset signal VINI can be applied to the first electrode of the light-emitting element OLED through the reset transistor T5, and applied to the first electrode of the driving transistor DT through the second light-emitting control transistor T4. For example, as illustrated in FIG. 17C, in the compensation stage 2 and the data writing stage 3, the reset transistor T5 is in the turn-on state, the second light-emitting control transistor T4 is in the turn-off state, and the reset signal VINI can be applied to the first electrode of the light-emitting element OLED through the reset transistor T5, so that the voltage of the first electrode 600*a* remains stable, and reduce a risk of abnormal light-emitting of the light-emitting element OLED because of sudden changes in the voltage of the first electrode 600*a*.

For example, as illustrated in FIG. 17D and FIG. 17E, when entering the light-emitting stage 4 from the data writing stage 3, both the data writing transistor T1 and the reset transistor T5 (multiplexed as the first switching transistor) are switched to the turn-off state. When the data writing transistor T1 is switched to the turn-off state, because parasitic capacitance exists between the gate electrode of the data writing transistor T1 and its second electrode (the first node N1), the voltage of the first node N1 may be decreased when the data writing transistor T1 is turned off. When the reset transistor T5 (multiplexed as the first switching transistor) is switched to the turn-off state, because parasitic capacitance exists between the gate electrode of the reset transistor T5 and its second electrode (the second electrode of the second storage capacitor C2), the voltage of the second electrode of the second storage capacitor C2 may be decreased when the reset transistor T5 is turned off. Because a voltage between two electrodes of the second storage capacitor C2 will not change suddenly, in the case where the voltage of the second electrode of the second storage capacitor C2 decreases, the voltage of the first electrode of the second storage capacitor C2 also decreases. Therefore, the value Vs of the voltage of the first electrode of the driving transistor DT decreases accordingly. In this way, the difference between the gate voltage of the driving transistor DT and the voltage of the first electrode of the driving transistor DT (that is, the gate-source voltage Vgs of the driving transistor DT) is basically unchanged, or has small fluctuations, which is beneficial to making the driving current flowing through the light-emitting element more stable and making the brightness of the display panel more uniform.

For example, as illustrated in FIG. 17A, compared with the pixel circuit 101 illustrated in FIG. 2A, by multiplexing the reset transistor T5 as the first switching transistor, the number of transistors in the pixel circuit 109 can be smaller, thereby making the structure of the pixel circuit 109 is simplified, and the control method of the pixel circuit is simplified. Simplifying the structure of the pixel circuit not only contributes to reducing the space occupied by each pixel circuit, but also contributes to simplifying the manufacturing process and reducing a difficulty of manufacturing the display panel including the pixel circuit, thereby improving the yield of the display panel.

Figure 18:
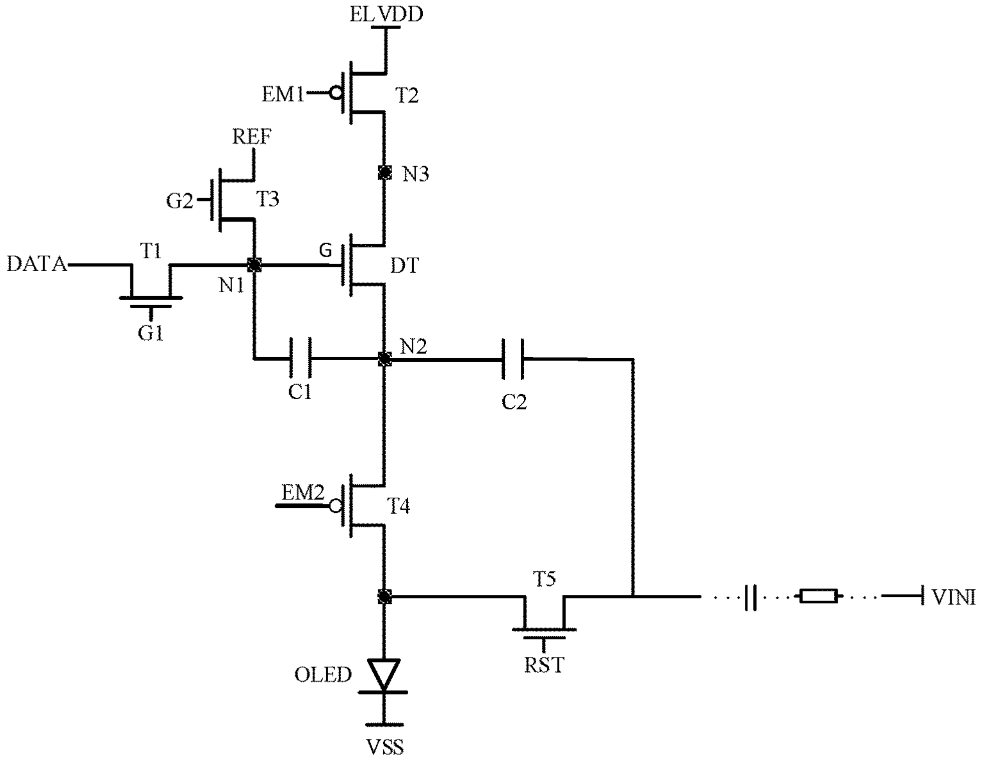
FIG. 18 is a circuit diagram of another implementation example of the pixel circuit illustrated in FIG. 16.
Figure 19:
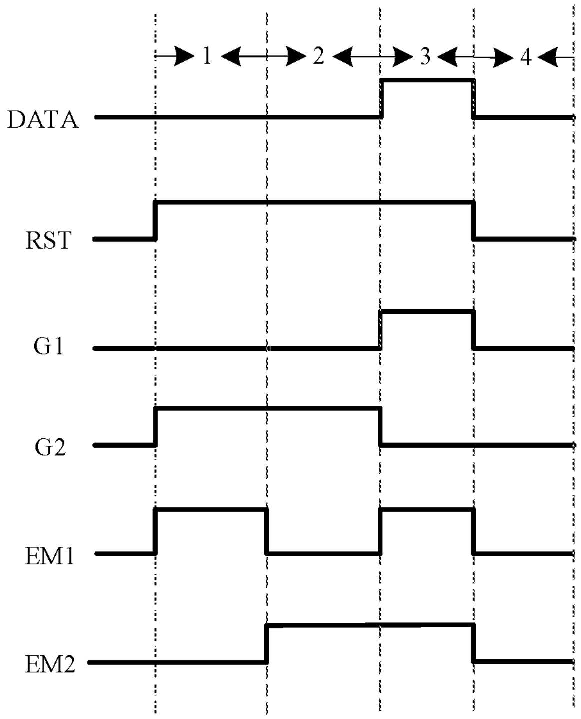
FIG. 19 is a signal timing diagram of another driving method provided by at least one embodiment of the present disclosure.

FIG. 18 is a circuit diagram of another implementation example of the pixel circuit illustrated in FIG. 16; FIG. 19 is a signal timing diagram of another driving method provided by at least one embodiment of the present disclosure.

For example, the pixel circuit illustrated in FIG. 16 can further be implemented as a pixel circuit structure illustrated in FIG. 18.

For example, as illustrated in FIG. 18, the pixel circuit 110 includes a driving transistor DT, a data writing transistor T1, a first light-emitting control transistor T2, a first compensation transistor T3, a second light-emitting control transistor T4, a reset transistor T5, a first storage capacitor C1, a second storage capacitor C2 and a light-emitting element OLED. For example, compared with the pixel circuit 109 illustrated in FIG. 17A, the difference of the pixel circuit 110 is that: the type of the first light-emitting control transistor T2 is different, the other structure can refer to the descriptions of FIG. 17A in the above embodiment, which will not be repeated here.

For example, as illustrated in FIG. 18, the first light-emitting control transistor T2 is a P-type transistor, the first light-emitting control transistor T2 is turned on in the case where the gate electrode of it is connected to a low-level signal, and is turned off in the case where the gate electrode of it is connected to a high-level signal.

For example, as illustrated in FIG. 18 and FIG. 19, during the driving process of the pixel circuit 110, the working states (for example, the turn-on state or the turn-off state) of each transistor is the same as that of the pixel circuit 109 illustrated in FIG. 17A. Compared with the timing diagram illustrated in FIG. 3, the timing states of the data signal DATA, the reset control signal RST, the data scan signal G1, the first compensation control signal G2 and the second light-emitting control signal EM2 remain unchanged, the difference is that the control signal of the light-emitting control signal EM1 is different. For example, in the pixel circuit 110, because the first light-emitting control transistor T2 is a P-type transistor, in the reset stage 1 and the data writing stage 3, the first light-emitting control signal EM1 is a high-level signal, so that the first light-emitting control transistor T2 is in the turn-off state. In the compensation stage 2 and the light-emitting stage 4, the first light-emitting control signal EM1 is a low-level signal, so that the first light-emitting control transistor T2 is in the turn-on state. Therefore, the type of the first light-emitting control transistor T2 can be selected according to design requirements, so that the pixel circuit 110 has a flexible and changeable structure.

Figure 20:
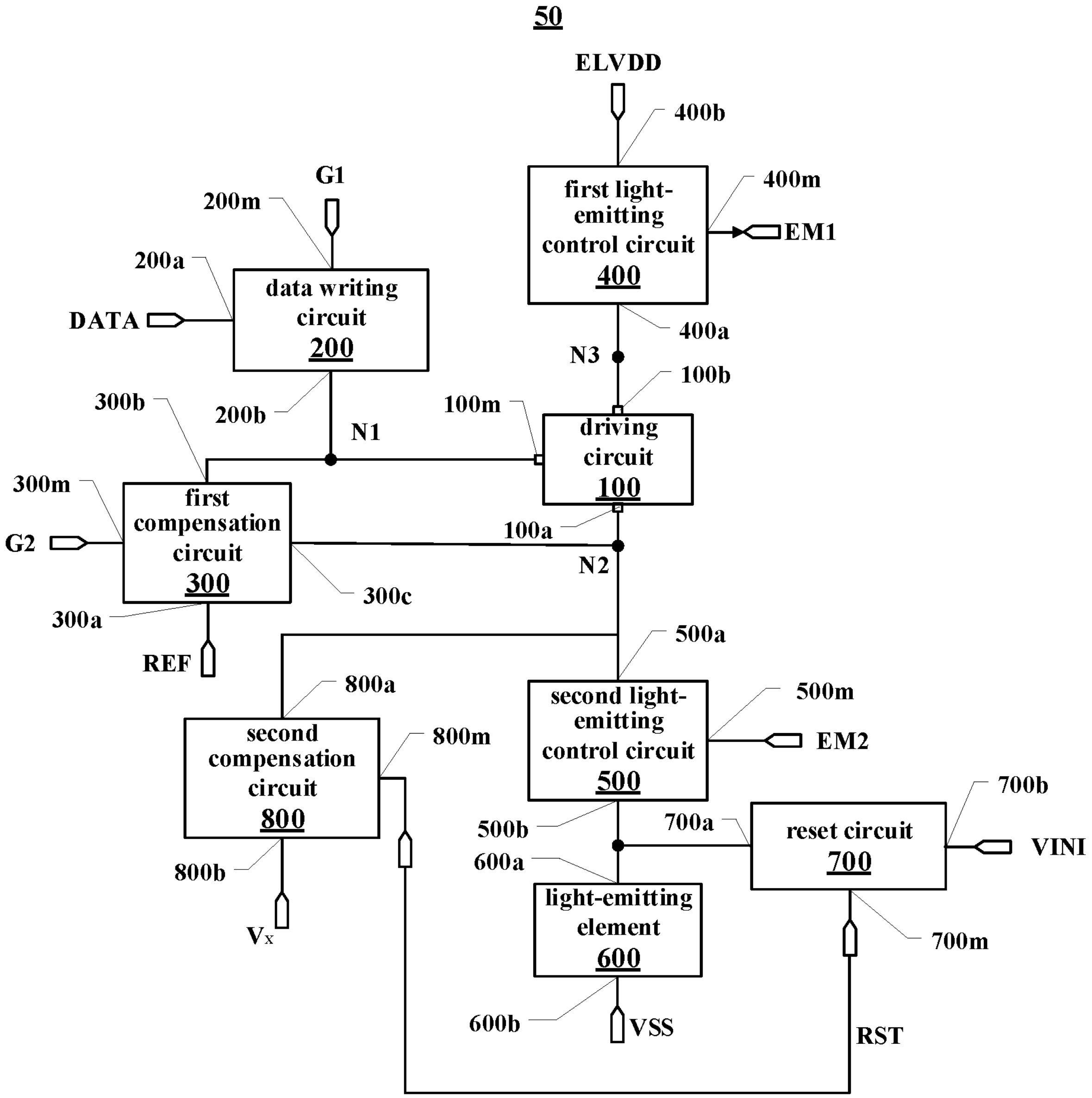
FIG. 20 is a schematic block diagram of another pixel circuit provided by at least one embodiment of the present disclosure.

FIG. 20 is a schematic block diagram of another pixel circuit provided by at least one embodiment of the present disclosure.

For example, as illustrated in FIG. 20, the pixel circuit 50 includes a driving circuit 100, a data writing circuit 200, a first compensation circuit 300, a first light-emitting control circuit 400, a second light-emitting control circuit 500, a light-emitting element 600, a reset circuit 700, and a second compensation circuit 800. For example, compared with the pixel circuit 10 illustrated in FIG. 1, the difference of the pixel circuit 40 is that the second compensation circuit 800 is different, for the other structure, please refer to the relevant descriptions of FIG. 1 in the above embodiment, which will not be repeated here.

For example, referring to FIG. 20, the second compensation circuit 800 includes a control terminal 800*m*, a first terminal 800*a* and a second terminal 800*b*, the control terminal 800*m* of the second compensation circuit 800 is configured to receive the second compensation control signal, the first terminal 800*a* of the second compensation circuit 800 is electrically connected to the second node N2, and the second terminal 800*b* of the second compensation circuit 800 is electrically connected to a constant voltage terminal Vx to receive a constant voltage Vx. The second compensation circuit 800 is configured to compensate the driving circuit 100 in response to the second compensation control signal. For example, in the pixel circuit 50 illustrated in FIG. 20, the control terminal 800*m* of the second compensation circuit 800 is electrically connected to the control terminal 700*m* of the reset circuit 700, that is, the two are common control terminals, the reset control signal RST simultaneously serves as the second compensation control signal, so that the turn-on state and the turn-off state of the second compensation circuit 800 and the reset circuit 700 can be simultaneously controlled. For example, in the case where the reset control signal RST serves as the turn-on signal, the reset circuit 700 and the second compensation circuit 800 are turned on at the same time; in the case where the reset control signal RST serves as the turn-off signal, the reset circuit 700 and the second compensation circuit 800 are turned off at the same time.

Figure 21A:
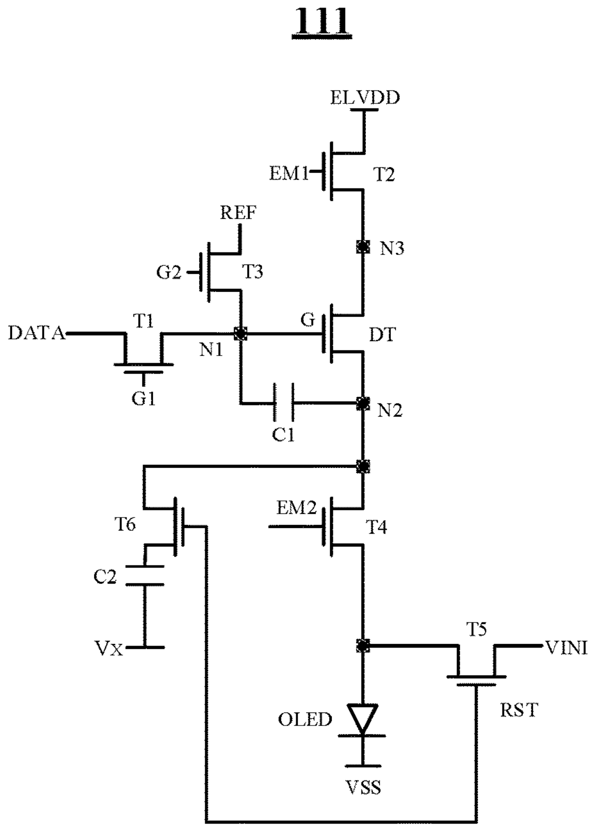
FIG. 21A is a circuit diagram of an implementation example of the pixel circuit illustrated in FIG. 20.
Figure 21B:
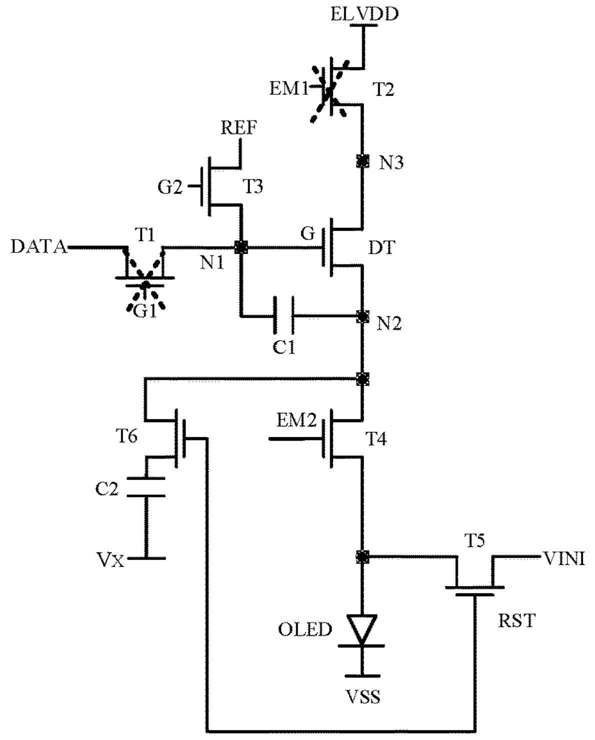
FIG. 21B is a schematic diagram of the pixel circuit illustrated in FIG. 21A when it is in a reset stage.
Figure 21C:
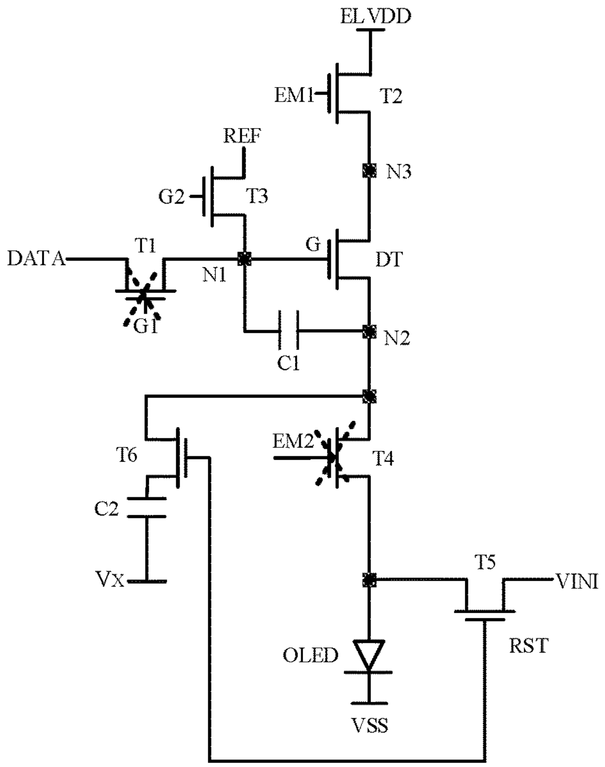
FIG. 21C is a schematic diagram of the pixel circuit illustrated in FIG. 21A when it is in a compensation stage.
Figure 21D:
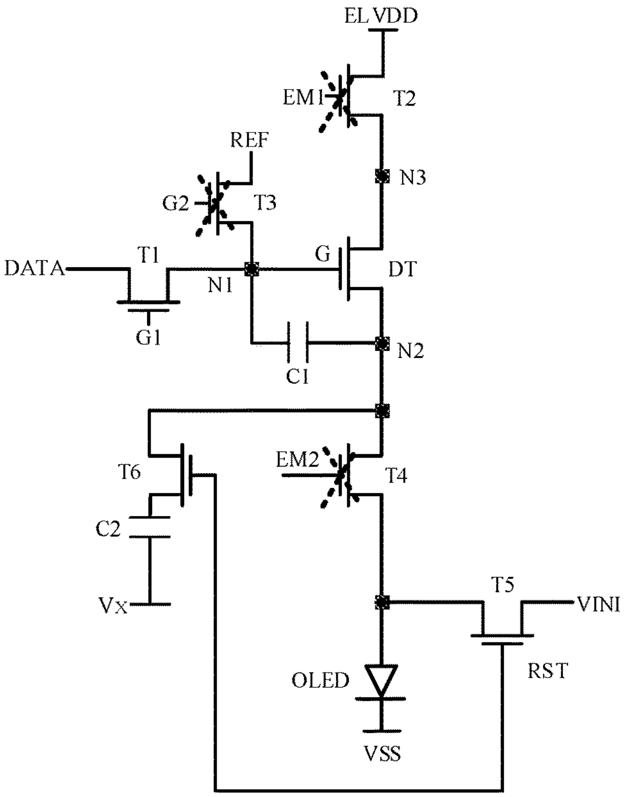
FIG. 21D is a schematic diagram of the pixel circuit illustrated in FIG. 21A when it is in a data writing stage.
Figure 21E:
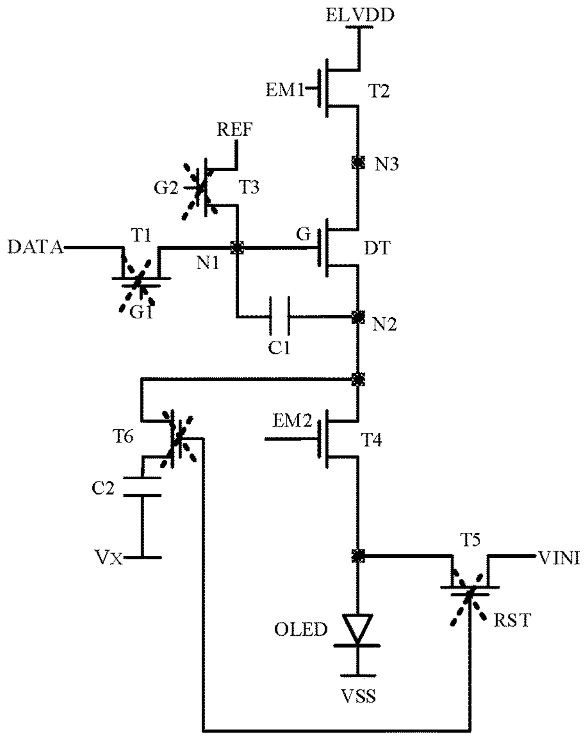
FIG. 21E is a schematic diagram of the pixel circuit illustrated in FIG. 21A when it is in a light-emitting stage.

FIG. 21A is a circuit diagram of an implementation example of the pixel circuit illustrated in FIG. 20. FIG. 21B is a schematic diagram of the pixel circuit illustrated in FIG. 21A when it is in a reset stage. FIG. 21C is a schematic diagram of the pixel circuit illustrated in FIG. 21A when it is in a compensation stage. FIG. 21D is a schematic diagram of the pixel circuit illustrated in FIG. 21A when it is in a data writing stage. FIG. 21E is a schematic diagram of the pixel circuit illustrated in FIG. 21A when it is in a light-emitting stage. In addition, the transistors marked with dotted lines in FIG. 21B to FIG. 21E all indicate that they are in a turn-off state in the corresponding stage.

For example, as illustrated in FIG. 21A, a pixel circuit 111 includes a driving transistor DT, a data writing transistor T1, a first light-emitting control transistor T2, a first compensation transistor T3, a second light-emitting control transistor T4, a reset transistor T5, a first switching transistor T6, a first storage capacitor C1, a second storage capacitor C2 and a light-emitting element.

For example, as illustrated in FIG. 21A, the difference between the pixel circuit 111 and the pixel circuit 102 illustrated in FIG. 4 is that: a connection method and type of the first switching transistor T6 and a connection method of the second storage capacitor C2 have been changed, and the other structures are the same. For other structures in the pixel circuit 111, please refer to the descriptions of FIG. 4 in the above embodiment, which will not be repeated here.

For example, as illustrated in FIG. 21A, in the pixel circuit 111, the gate electrode of the first switching transistor T6 is electrically connected to the gate electrode of the reset transistor T5, the first switching transistor T6 and the reset transistor T5 share the gate electrode, and the reset control signal RST serves as the second compensation control signal, and the type of the first switching transistor T6 is the same as that of the reset transistor T5. The first electrode of the first switching transistor T6 is electrically connected to the first electrode of the second storage capacitor C2, the second electrode of the first switching transistor T6 is electrically connected to the second node N2, and the second electrode of the second storage capacitor C2 is electrically connected to a constant voltage terminal Vx to receive a constant voltage Vx from the constant voltage terminal Vx. For example, in the case where the reset control signal RST is a turn-on signal, the first switching transistor T6 and the reset transistor T5 are both turned on; conversely, in the case where the reset control signal RST is a turn-off signal, the first switching transistor T6 and the reset transistor T5 are both turned off.

For example, as illustrated in FIG. 21A, a timing diagram corresponding to the pixel circuit 111 and the pixel circuit 102 illustrated in FIG. 4 are the same, and both can refer to FIG. 5, the difference is that the working process of the first switching transistor T6 and the second storage capacitor C2 is changed. For the working process of other components in the pixel circuit 111, please refer to the relevant descriptions of FIG. 4 in the above embodiment, which will not be repeated here.

For example, as illustrated in FIG. 21B, in reset stage 1, the first switching transistor T6 and the reset transistor T5 are turned on in response to the reset control signal RST, and the voltage of the first electrode of the first switching transistor T6 (the first electrode of the second storage capacitor C2) is equal to the reset voltage VINI, and the voltage of the second electrode of the second storage capacitor C2 is equal to the constant voltage Vx.

For example, as illustrated in FIG. 21C, in the compensation stage 2, the first switching transistor T6 and the reset transistor T5 are turned on in response to the reset control signal RST, and an initial voltage of the first electrode of the first switching transistor T6 (the first electrode of the second storage capacitor C2) is the reset voltage VINI. The first light-emitting control transistor T2 is in the turn-on state, so the driving transistor DT can be charged. In the case where the driving transistor DT is turned off, a voltage of the first terminal of the driving transistor DT, that is, the voltage value Vs of the first electrode of the first switching transistor T6 (the first electrode of the storage capacitor C2) is equal to Vref−Vth, and the voltage of the second electrode of the second storage capacitor C2 is the constant voltage Vx.

For example, as illustrated in FIG. 21D, in the data writing stage 3, the first switching transistor T6 and the reset transistor T5 are turned on in response to the reset control signal RST, the data signal DATA is written to the gate electrode of the driving transistor DT, and a voltage of the first terminal the driving transistor DT, that is, the voltage of the first electrode of the first switching transistor T6 (the first electrode of the second storage capacitor C2) is Vref−Vth+C1/(C1+C2)×(Vdata−Vref), the voltage of the second electrode of the second storage capacitor C2 is the constant voltage Vx.

For example, as illustrated in FIG. 21E, in the light-emitting stage 4, the first switching transistor T6 and the reset transistor T5 are turned off in response to the reset control signal RST, and the data writing transistor T1 is turned off in response to the data scan signal G1. When the data writing transistor T1 is turned off, the voltage of the first node N1 is reduced; and when the first switching transistor T6 is turned off, the voltage of the second node N2 is reduced, so that the difference between the voltage of the gate electrode of the driving transistor DT and the voltage of the first electrode of the driving transistor DT (that is, the gate-source voltage Vgs of the driving transistor DT) is basically unchanged or has small fluctuations, which is beneficial to making the driving current flowing through the light-emitting element more stable and making the brightness of the display panel more uniform. At the same time, because the first switching transistor T6 is in the turn-off state, the first electrode and the second electrode of the second storage capacitor C2 are disconnected from other components in the pixel circuit 111, thereby reducing the capacitance between the second storage capacitor C2 and other component in the pixel circuit 111, and reducing a risk of circuit failure.

For example, referring to FIG. 21A, in some embodiments of the present disclosure, the gate electrode of the first switching transistor T6 and the gate electrode of the reset transistor T5 may be independent of each other and not electrically connected. For example, the gate electrode of the first switching transistor T6 is configured to receive the second compensation control signal, the gate electrode of the reset transistor T5 is configured to receive the reset signal RST, and the second compensation control signal and the reset signal RST come from different signal terminals respectively. At this time, the type of the first switching transistor T6 and the type of the reset transistor T5 may be different. Therefore, the first switching transistor T6 can be controlled individually, so that the pixel circuit has a more flexible control mode.

Figure 22:
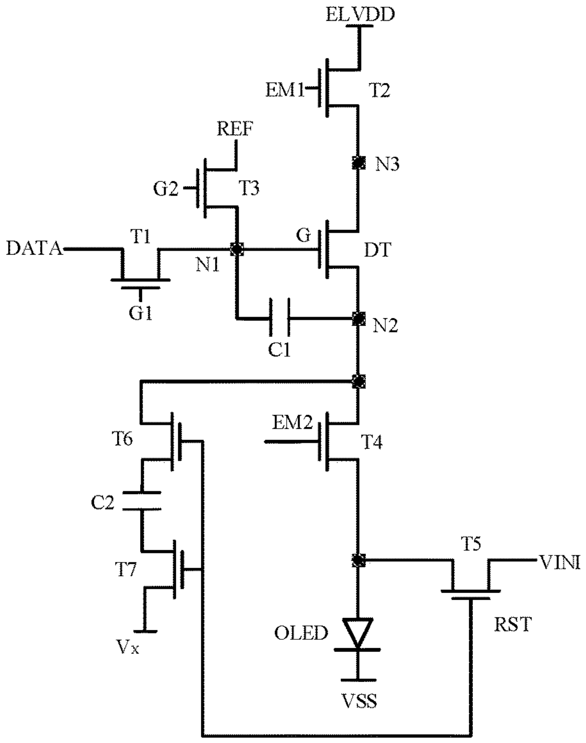
FIG. 22 is a circuit diagram of another implementation example of the pixel circuit illustrated in FIG. 20.

FIG. 22 is a circuit diagram of another implementation example of the pixel circuit illustrated in FIG. 20.

For example, as illustrated in FIG. 22, a pixel circuit 112 includes a driving transistor DT, a data writing transistor T1, a first light-emitting control transistor T2, a first compensation transistor T3, a second light-emitting control transistor T4, a reset transistor T5, a first switching transistor T6, a second switching transistor T7, a first storage capacitor C1, a second storage capacitor C2 and a light-emitting element. For example, the difference between the pixel circuit 112 and the pixel circuit 111 illustrated in FIG. 21A is that: the pixel circuit 111 further includes the second switching transistor T7, and the other structures are the same. For other structures in the pixel circuit 111, please refer to the descriptions of FIG. 21A in the above embodiment, which will not be repeated here.

For example, as illustrated in FIG. 22, in the pixel circuit 112, the first electrode of the first switching transistor T6 is electrically connected to the first electrode of the second storage capacitor C2, and the second electrode of the first switching transistor T6 is electrically connected to the second node N2, the first electrode of the second switching transistor T7 is electrically connected to the second electrode of the second storage capacitor C2, and the second electrode of the second switching transistor T7 is electrically connected to a constant voltage terminal Vx to receive a constant voltage from the constant voltage terminal Vx, so that the second electrode of the second storage capacitor C2 can receive the constant voltage Vx through the second switching transistor T7. The gate electrode of the first switching transistor T6, the gate electrode of the second switching transistor T7 and the gate electrode of the reset transistor T5 are electrically connected, and the first switching transistor T6 and the second switching transistor T7 both share the gate electrode with the reset transistor T5, the reset control signal RST serves as the second compensation control signal, and the type of the first switching transistor T6 and the type of the second switching transistor T7 are the same as the type of the reset transistor T5. For example, in the case where the reset control signal RST is a turn-on signal, the first switching transistor T6, the second switching transistor T7 and the reset transistor T5 are all turned on; conversely, in the case where the reset control signal RST is a turn-off signal, the first switching transistor T6, the second switching transistor T7 and the reset transistor T5 are all turned off.

For example, as illustrated in FIG. 22, the corresponding timing diagrams of the pixel circuit 112 and the pixel circuit 111 illustrated in FIG. 21A are the same, and both can refer to FIG. 5. For the working process of the pixel circuit 112, please refer to the relevant descriptions of FIG. 21A in the above embodiment, which will not be repeated here.

For example, as illustrated in FIG. 5 and FIG. 22, in the light-emitting stage 4, because the first switching transistor T6, the second switching transistor T7 and the reset transistor T5 in the pixel circuit 112 are all in the turn-off state, the first electrode and the second electrode of the second storage capacitor C2 are both disconnected from other components in the pixel circuit 112, and the first electrode and the second electrode of the second storage capacitor C2 are further disconnected from the constant voltage terminal Vx, thereby further reducing the risk of generating parasitic capacitance between the second storage capacitor C2 and other component in the pixel circuit 112 to reduce an occurrence of circuit failure.

For example, referring to FIG. 22, for the pixel circuit 112, the gate electrode of the first switching transistor T6, the gate electrode of the second switching transistor T7, and the gate electrode of the reset transistor T5 may not be electrically connected. For example, in some embodiments of the present disclosure, at least two of the gate electrode of the first switching transistor T6, the gate electrode of the second switching transistor T7, and the gate electrode of the reset transistor T5 be electrically connected, and the at least two of the switching transistor T6, the second switching transistor T7 and the reset transistor T5 share the gate electrode and are of the same type.

For example, referring to FIG. 22, for the pixel circuit 112, the gate electrode of the first switching transistor T6 and the gate electrode of the second switching transistor T7 can be electrically connected, the first switching transistor T6 and the second switching transistor T7 share the gate electrode and are of the same type. The gate electrode of the first switching transistor T6 and the gate electrode of the second switching transistor T7 are configured to receive the second compensation control signal, the gate electrode of the reset transistor T5 is configured to receive the reset control signal RST, and the second compensation control signal and the reset control signal RST come from different signal terminals.

For example, referring to FIG. 22, for the pixel circuit 112, the gate electrode of one of the first switching transistor T6 and the second switching transistor T7 may be electrically connected to the gate electrode of the reset transistor T5, and the one of the first switching transistor T6 and the second switching transistor T7 shares the gate electrode with the reset transistor T5 and is of the same type with the reset transistor T5. The gate electrode of the other of the first switching transistor T6 and the second switching transistor T7 is configured to receive the second compensation control signal, the gate electrode of the reset transistor T5 is configured to receive the reset control signal RST, and the second compensation control signal and the reset control signal RST come from different signal output terminals respectively.

For example, referring to FIG. 5 and FIG. 22, the embodiments of the present disclosure do not limit an electrical connection form and the types of the first switching transistor T6, the second switching transistor T7 and the reset transistor T5, as long as the first switching transistor T6, the second switching transistor T7 and the reset transistor T5 are all in the turn-on state in the reset stage 1, the compensation stage 2 and the data writing stage 3, and are all in the turn-off state in the light-emitting stage 4.

Figure 23:
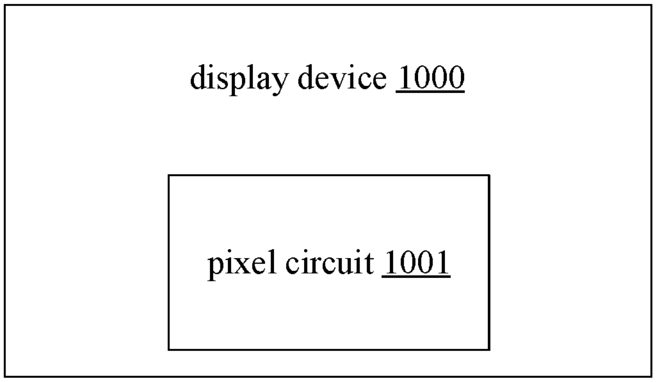
FIG. 23 is a schematic block diagram of a display device provided by at least one embodiment of the present disclosure.

FIG. 23 is a schematic block diagram of a display device provided by at least one embodiment of the present disclosure. Referring to FIG. 23, a display device 1000 provided by at least one embodiment of the present disclosure includes any one of the pixel circuits 1001 provided by the embodiments of the present disclosure. The display device may be, for example, a device with a display function such as an organic light-emitting diode display device or a quantum dot light-emitting diode display device, or other types of devices, which is not limited by the embodiments of the present disclosure.

Other structures and functions of the display device provided by the embodiments of the present disclosure can be implemented by referring to conventional technologies, which will not be limited by the embodiments of the present disclosure. For the technical effects of the display device provided by the embodiments of the present disclosure, reference can be made to the above descriptions of the technical effects of the pixel circuits provided by the embodiments of the present disclosure, which will not be repeated here.

For example, the display device 1000 provided by at least one embodiment of the present disclosure can be any product or component with a display function, such as a display panel, a mobile phone, a tablet computer, a television, a monitor, a notebook computer, a digital photo frame, a navigator or the like, which is not be limited by the embodiments of the present disclosure.

There are the following points to be clarified:

(1) The accompanying drawings of the embodiments of the present disclosure relate only to the structures involved with the embodiments of the present disclosure, and other structures can be referred to the usual design.

(2) Features in the same embodiment and different embodiments of the present disclosure may be combined with each other without conflict.

The foregoing is only an exemplary embodiment of the present disclosure and is not intended to limit the scope of protection of the present disclosure, which is determined by the appended rights.

The invention claimed is:

1. A pixel circuit, comprising:

a driving circuit, comprising a control terminal, a first terminal and a second terminal, and configured to control a magnitude of driving current flowing through the first terminal and the second terminal;

a light-emitting element, configured to emit light upon being driven by the driving current, wherein the first terminal of the driving circuit is connected to a first electrode of the light-emitting element so as to supply the driving current to the light-emitting element;

a first compensation circuit, configured to apply a reference signal to the control terminal of the driving circuit in response to a first compensation control signal, wherein the first compensation circuit comprises a first storage capacitor, and a first electrode of the first storage capacitor is electrically connected to the control terminal of the driving circuit, and a second electrode of the first storage capacitor is electrically connected to the first terminal of the driving circuit; and a second compensation circuit, comprising a second storage capacitor and a first switching transistor, wherein a first electrode of the first switching transistor is connected to a first electrode of the second storage capacitor, one of a second electrode of the first switching transistor and a second electrode of the second storage capacitor is connected to the first terminal of the driving circuit, and the other one of the second electrode of the first switching transistor and the second electrode of the second storage capacitor is connected to a constant voltage terminal, a gate electrode of the first switching transistor is configured to receive a second compensation control signal, and the second compensation circuit is configured to compensate the driving circuit in response to the second compensation control signal, wherein the first switching transistor is connected in series with the second storage capacitor to form a series circuit with the second electrode of the first switching transistor and the second electrode of the second storage capacitor at the two ends of the series circuit, and the second electrode of the first switching transistor and the second electrode of the second storage capacitor are not electrically connected with each other, wherein none of the first electrode of the first switching transistor and the first electrode of the second storage capacitor is electrically connected to the first terminal of the driving circuit.

2. The pixel circuit according to claim 1, further comprising:

the driving circuit comprises a driving transistor, a gate electrode of the driving transistor serves as the control terminal of the driving circuit and is electrically connected to a first node, and a first electrode of the driving transistor serves as the first terminal of the driving circuit and is electrically connected to a second node, and the second electrode of the driving transistor serves as the second terminal of the driving circuit and is electrically connected to a third node.

3. The pixel circuit according to claim 2, wherein the second electrode of the first switching transistor is electrically connected to the second node.

4. The pixel circuit according to claim 2, wherein the second electrode of the second storage capacitor is electrically connected to the second node.

5. The pixel circuit according to claim 2, further comprising:

a reset circuit, wherein a control terminal of the reset circuit is configured to receive a reset control signal, a first terminal of the reset circuit is electrically connected to the first electrode of the light-emitting element, and a second terminal of the reset circuit is electrically connected to a reset signal terminal to receive a reset signal, and the reset circuit is configured to apply the reset signal to the first electrode of the light-emitting element and the first terminal of the driving circuit in response to the reset control signal;

the reset circuit comprises a reset transistor, a gate electrode of the reset transistor is electrically connected to a reset control terminal to receive the reset control signal, and a first electrode of the reset transistor is electrically connected to the first electrode of the light-emitting element, a second electrode of the reset transistor is electrically connected to the reset signal terminal to receive the reset signal.

6. The pixel circuit according to claim 5, wherein the second electrode of the second storage capacitor is electrically connected to the constant voltage terminal to receive a constant voltage from the constant voltage terminal.

7. The pixel circuit according to claim 6, wherein the second electrode of the first switching transistor is electrically connected to the second node, and the second electrode of the second storage capacitor is electrically connected to the constant voltage terminal.

8. The pixel circuit according to claim 6, wherein the second electrode of the second storage capacitor is electrically connected to the second node, the second electrode of the first switching transistor is electrically connected to the constant voltage terminal.

9. The pixel circuit according to claim 6, wherein the reset transistor serves as the first switching transistor, and the reset control signal serves as the second compensation control signal, and the reset signal terminal which is electrically connected to the second electrode of the reset transistor serves as the constant voltage terminal;

the second electrode of the second storage capacitor is electrically connected to the second node, and the first electrode of the second storage capacitor is electrically connected to the first electrode of the reset transistor.

10. The pixel circuit according to claim 6, wherein the gate electrode of the first switching transistor is electrically connected to the gate electrode of the reset transistor, and the first switching transistor shares the gate electrode with the reset transistor, the reset control signal serves as the second compensation control signal, and a type of the first switching transistor is the same as a type of the reset transistor; or, the gate electrode of the first switching transistor and the gate electrode of the reset transistor are independent of each other and not electrically connected to each other.

11. The pixel circuit according to claim 6, wherein the second compensation circuit further comprises a second switching transistor, a first electrode of the second switching transistor is electrically connected to the second electrode of the second storage capacitor, and a second electrode of the second switching transistor is electrically connected to the constant voltage terminal.

12. The pixel circuit according to claim 5, wherein the second electrode of the second storage capacitor is electrically connected to the first electrode of the light-emitting element, and the first electrode of the reset transistor is electrically connected to the first electrode of the light-emitting element.

13. The pixel circuit according to claim 5, wherein the pixel circuit further comprises a first light-emitting control circuit, a control terminal of the first light-emitting control circuit is configured to receive a first light-emitting control signal, a first terminal of the first light-emitting control circuit is electrically connected to the second terminal of the driving circuit, and a second terminal of the first light-emitting control circuit is electrically connected to a first voltage terminal to receive a first power supply voltage, the first light-emitting control circuit is configured to apply the first power supply voltage to the second terminal of the driving circuit in response to the first light-emitting control signal;

wherein the pixel circuit further comprises a second light-emitting control circuit, a control terminal of the second light-emitting control circuit is configured to receive a second light-emitting control signal, a first terminal of the second light-emitting control circuit is electrically connected to the second node, a second terminal of the second light-emitting control circuit is electrically connected to the first electrode of the light-emitting element, and the second light-emitting control circuit is configured to apply the driving current to the light-emitting element in response to the second light-emitting control signal and allow the reset signal to be applied to the first terminal of the driving circuit, the second light-emitting control signal being different from the first light-emitting control signal;

the second light-emitting control circuit comprises a second light-emitting control transistor, a gate electrode of the second light-emitting control transistor is electrically connected to a second light-emitting control terminal to receive the second light-emitting control signal, and a first electrode of the second light-emitting control transistor is electrically connected to the second node, a second electrode of the light-emitting control transistor is electrically connected to the first electrode of the light-emitting element, and a second electrode of the light-emitting element is electrically connected to a second voltage terminal to receive a second power supply voltage, wherein the gate electrode of the first switching transistor is electrically connected with the gate electrode of the second light-emitting control transistor, and the first switching transistor shares the gate electrode with the second light-emitting control transistor, the second light-emitting control signal serves as the second compensation control signal, and a type of the first switching transistor is different from a type of the second light-emitting control transistor; or the gate electrode of the first switching transistor and the gate electrode of the second light-emitting control transistor are independent of each other and not electrically connected to each other.

14. The pixel circuit according to claim 2, wherein a control terminal of the first compensation circuit is configured to receive the first compensation control signal, and a first terminal of the first compensation circuit is electrically connected to a reference signal terminal to receive the reference signal, the first compensation circuit comprises a first compensation transistor, a gate electrode of the first compensation transistor is electrically connected to a first compensation control signal terminal to receive the first compensation control signal, a first electrode of the first compensation transistor is electrically connected to the reference signal terminal to receive the reference signal, and a second electrode of the first compensation transistor is electrically connected to the first node.

15. A display device, comprising the pixel circuit according to claim 1.

16. A driving method, suitable for a pixel circuit comprising: a driving circuit, comprising a control terminal, a first terminal and a second terminal, and configured to control a magnitude of driving current flowing through the first terminal and the second terminal; a light-emitting element, configured to emit light upon being driven by the driving current, wherein the first terminal of the driving circuit is connected to a first electrode of the light-emitting element so as to supply the driving current to the light-emitting element; a first compensation circuit, configured to apply a reference signal to the control terminal of the driving circuit in response to a first compensation control signal, wherein the first compensation circuit comprises a first storage capacitor, and a first electrode of the first storage capacitor is electrically connected to the control terminal of the driving circuit, and a second electrode of the first storage capacitor is electrically connected to the first terminal of the driving circuit; and a second compensation circuit, comprising a second storage capacitor and a first switching transistor, wherein a first electrode of the first switching transistor is connected to a first electrode of the second storage capacitor, one of a second electrode of the first switching transistor and a second electrode of the second storage capacitor is connected to the first terminal of the driving circuit, and the other one of the second electrode of the first switching transistor and the second electrode of the second storage capacitor is connected to a constant voltage terminal, a gate electrode of the first switching transistor is configured to receive a second compensation control signal, and the second compensation circuit is configured to compensate the driving circuit in response to the second compensation control signal, wherein the first switching transistor is connected in series with the second storage capacitor to form a series circuit with the second electrode of the first switching transistor and the second electrode of the second storage capacitor at the two ends of the series circuit, and the second electrode of the first switching transistor and the second electrode of the second storage capacitor are not electrically connected with each other, wherein the driving method comprises:

in a data writing stage, making the second compensation control signal be a turn-on signal to turn on the first switching transistor;

upon entering a light-emitting stage from the data writing stage, making the second compensation control signal be switched from a turn-on signal to a turn-off signal to turn off the first switching transistor, wherein, in the light-emitting stage, the second compensation control signal remains as the turn-off signal; and in a compensation stage before the data writing stage, making the second compensation control signal be a turn-on signal to turn on the first switching transistor, and the second compensation circuit is configured to compensate the driving circuit in response to the second compensation control signal, wherein, in the compensation stage, the second electrode of the second storage capacitor receives a constant voltage from the constant voltage terminal.

17. The driving method according to claim 16, wherein the pixel circuit further comprises a data writing circuit, a control terminal of the data writing circuit is configured to receive a data scan signal, a first terminal of the data writing circuit is electrically connected to a data signal terminal to receive a data signal, a second terminal of the data writing circuit is electrically connected to a first node, and the data writing circuit is configured to write the data signal into the control terminal of the driving circuit in response to the data scan signal;

the driving method further comprises:

in the data writing stage, making the data scan signal be a turn-on signal to write the data signal to the control terminal of the driving circuit; and upon entering the light-emitting stage from the data writing stage, making the data scan signal be switched from the turn-on signal to a turn-off signal to turn off the data writing circuit and the first switching transistor simultaneously, wherein in the light-emitting stage, the data scan signal remains as the turn-off signal.

18. The driving method according to claim 16, wherein the pixel circuit further comprises a light-emitting element, a second light-emitting control circuit and a reset circuit; the light-emitting element is configured to emit light upon being driven by the driving current; a control terminal of the second light-emitting control circuit is configured to receive a second light-emitting control signal, a first terminal of the second light-emitting control circuit is electrically connected to the first terminal of the driving circuit, and a second terminal of the second light-emitting control circuit is electrically connected to a first electrode of the light-emitting element; a control terminal of the reset circuit is configured to receive a reset control signal, and a first terminal of the reset circuit is electrically connected to the first electrode of the light-emitting element, a second terminal of the reset circuit is electrically connected to a reset signal terminal to receive a reset signal, the driving method further comprises: in a reset stage before the compensation stage, making the first compensation control signal be a turn-on signal to turn on the first compensation circuit, so that the first compensation circuit applies the reference signal to the control terminal of the driving circuit, making the second light-emitting control signal be a turn-on signal to turn on the second light-emitting control circuit, and making the reset control signal be a turn-on signal to turn on the reset circuit, so that the reset signal is applied to the first electrode of the light-emitting element through the reset circuit, and the reset signal is applied to the first terminal of the driving circuit through the second light-emitting control circuit, wherein, in each of the reset stage, the compensation stage, the data writing stage, and the light-emitting stage, the second compensation control signal and the second light-emitting control signal are opposite switching signals to control switching states of their corresponding circuits to be opposite.

* * * * *